United States Patent
Sekiguchi et al.

(10) Patent No.: US 9,930,355 B2
(45) Date of Patent: *Mar. 27, 2018

(54) OPTIMIZED IMAGE DECODING DEVICE AND METHOD FOR A PREDICTIVE ENCODED BIT STREAM

(71) Applicant: MITSUBISHI ELECTRIC CORPORATION, Tokyo (JP)

(72) Inventors: Shunichi Sekiguchi, Tokyo (JP); Kazuo Sugimoto, Tokyo (JP); Yusuke Itani, Tokyo (JP); Akira Minezawa, Tokyo (JP); Yoshiaki Kato, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/626,603

(22) Filed: Feb. 19, 2015

(65) Prior Publication Data

US 2015/0229946 A1 Aug. 13, 2015

Related U.S. Application Data

(62) Division of application No. 14/560,972, filed on Dec. 4, 2014, now Pat. No. 9,036,713, which is a division
(Continued)

(30) Foreign Application Priority Data

May 29, 2009 (JP) ................................ 2009-130433

(51) Int. Cl.
*H04N 19/513* (2014.01)
*H04N 19/52* (2014.01)
(Continued)

(52) U.S. Cl.
CPC ......... *H04N 19/513* (2014.11); *H04N 19/132* (2014.11); *H04N 19/147* (2014.11);
(Continued)

(58) Field of Classification Search
None
See application file for complete search history.

(56) References Cited

U.S. PATENT DOCUMENTS 5,867,600 A * 2/1999 Hongu .................... G06T 9/004
382/247
8,111,752 B2 * 2/2012 Kumar ............ H04N 19/00151
375/240.16
(Continued)

FOREIGN PATENT DOCUMENTS

JP 2003-259377 A 9/2003
JP 2008-48289 A 2/2008
(Continued)

OTHER PUBLICATIONS

Kim, et al. "Enlarging MB Size for High Fidelity Video Coding Beyond HD." ITU Telecommunications Standardization Sector, Study Group 16, Video Coding Experts Group (VCEG), VCEG-AJ21, 36lh Meeting, San Diego, USA, Oct. 8-10, 2008.*
(Continued)

*Primary Examiner* — Dave Czekaj
*Assistant Examiner* — Tyler W Sullivan
(74) *Attorney, Agent, or Firm* — Birch, Stewart, Kolasch & Birch, LLP

(57) ABSTRACT

An image decoding device and method that set up a first skip mode and second skip mode for each motion prediction and block and its motion vector allocation regions, respectively, allowing for expressing a hierarchy of skip modes when
(Continued)

ctx_mc_mode_bin0 = (A == mc_skip) + (B == mc_skip)
ctx_sub_mc_mode_bin0 = (A == skip) + (B == skip)

skip = (mc_skip || sub_mc_skip)

decoding a video signal having a specific format and can be adaptive to the characteristics of a temporal change of each color component signal.

5 Claims, 23 Drawing Sheets

Related U.S. Application Data of application No. 13/322,820, filed as application No. PCT/JP2010/003553 on May 27, 2010, now Pat. No. 8,934,548.

(51) Int. Cl.

| | |
|---|---|
| H04N 19/176 | (2014.01) |
| H04N 19/147 | (2014.01) |
| H04N 19/46 | (2014.01) |
| H04N 19/132 | (2014.01) |
| H04N 19/30 | (2014.01) |
| H04N 19/186 | (2014.01) |
| H04N 19/625 | (2014.01) |
| H04N 19/53 | (2014.01) |
| H04N 19/55 | (2014.01) |
| H04N 19/70 | (2014.01) |
| H04N 19/61 | (2014.01) |
| H04N 19/96 | (2014.01) |
| H04N 19/91 | (2014.01) |
| H04N 19/567 | (2014.01) |
| H04N 19/57 | (2014.01) |

(52) U.S. Cl.
CPC ......... *H04N 19/176* (2014.11); *H04N 19/186* (2014.11); *H04N 19/30* (2014.11); *H04N 19/46* (2014.11); *H04N 19/52* (2014.11); *H04N 19/53* (2014.11); *H04N 19/55* (2014.11); *H04N 19/619* (2014.11); *H04N 19/625* (2014.11); *H04N 19/567* (2014.11); *H04N 19/57* (2014.11); *H04N 19/61* (2014.11); *H04N 19/70* (2014.11); *H04N 19/91* (2014.11); *H04N 19/96* (2014.11)

(56) References Cited

U.S. PATENT DOCUMENTS

| | | | |
|---|---|---|---|
| 8,155,196 B2 | 4/2012 | Lee | |
| 8,213,503 B2 | 7/2012 | Tu et al. | |
| 8,391,362 B2 | 3/2013 | Maruyama et al. | |
| 8,644,389 B2 | 2/2014 | Chengalvala et al. | |
| 8,687,707 B2 | 4/2014 | Han | |
| 8,804,829 B2 | 8/2014 | Sun et al. | |
| 8,934,548 B2* | 1/2015 | Sekiguchi | H04N 19/186 375/240.02 |
| 9,036,713 B2* | 5/2015 | Sekiguchi | H04N 19/186 375/240.02 |
| 9,113,167 B2* | 8/2015 | Wiegand | H04N 19/34 |
| 2004/0131272 A1* | 7/2004 | Kobayashi | H04N 19/197 382/247 |
| 2004/0179601 A1* | 9/2004 | Kobayashi | H04N 19/159 375/240.12 |
| 2004/0234144 A1* | 11/2004 | Sugimoto | H04N 19/176 382/239 |
| 2005/0286777 A1 | 12/2005 | Kumar et al. | |
| 2006/0039470 A1* | 2/2006 | Kim | H04N 19/57 375/240.16 |
| 2006/0039476 A1 | 2/2006 | Watanabe | |
| 2007/0071105 A1* | 3/2007 | Tian | H04N 19/176 375/240.24 |
| 2008/0019448 A1* | 1/2008 | Lee | H04N 19/56 375/240.16 |
| 2008/0043843 A1 | 2/2008 | Nakaishi | |
| 2008/0101707 A1* | 5/2008 | Mukherjee | H04N 19/105 382/236 |
| 2008/0232465 A1* | 9/2008 | Zhang | H04N 19/139 375/240.03 |
| 2008/0253457 A1* | 10/2008 | Moore | H04N 19/52 375/240.16 |
| 2009/0196342 A1* | 8/2009 | Divorra Escoda | H04N 19/50 375/240.02 |
| 2009/0245376 A1 | 10/2009 | Choi et al. | |
| 2010/0086051 A1 | 4/2010 | Park et al. | |
| 2010/0239023 A1 | 9/2010 | Watanabe | |
| 2012/0320969 A1 | 12/2012 | Zheng et al. | |
| 2013/0003843 A1 | 1/2013 | Guo et al. | |
| 2015/0229949 A1* | 8/2015 | Sekiguchi | H04N 19/186 375/240.16 |
| 2015/0304677 A1* | 10/2015 | Sekiguchi | H04N 19/186 375/240.16 |

FOREIGN PATENT DOCUMENTS

| | | |
|---|---|---|
| JP | 2009-246972 A | 10/2009 |
| WO | 2008/133455 A1 | 11/2008 |

OTHER PUBLICATIONS

U.S. Appl. No. 61/103,221, Specification filed Oct. 6, 2008.*
U.S. Appl. No. 61/119,697, Specification filed Dec. 3, 2008.*
U.S. Appl. No. 61/120,060, Specification filed Dec. 5, 2008.*
U.S. Appl. No. 61/143,813, Specification filed Jan. 11, 2009.*
U.S. Appl. No. 61/154,420, Specification filed Feb. 22, 2009.*
U.S. Appl. No. 61/159,058, Specification filed Mar. 10, 2009.*
Detlev Marpe et al., "Video compression using context-based adaptive arithmetic coding", Berlin, Germany, 2001 IEEE, pp. 558-5611.
MPEG-4 AVC/H.264; Advanced video coding for generic audiovisual services, ITU-T Recommendation H. 264, Nov. 2007.
S. Kondo and H. Sasai, "A Motion Compensation Technique using Sliced Blocks and its Application to Hybrid Video Coding", VCIP, Jul. 2005, Matsushita Electric Industrial Co., Ltd., Osaka, Japan.
Siwei Ma and C.-C. Jay Kuo, "High-definition Video Coding with Super-macroblocks", Proc. SPIE, vol. 6508, 650816 (2007), University of Southern California, L.A., U.S.A.
Fast Inter-Mode Selection in the H.264/AVC Standard Using a Hierarchical Decision Process, 2008 IEEE, p. 186-195.
J. Kim et al. "Enlarging MB Size for High Fidelity Video Coding Beyond HD", ITU—Telecommunications Standardization Sector, VCEG-AJ21, pp. 1-6.
L-Shaped Segmentations in Motion-Compensated Prediction of H.264, 2008 IEEE, p. 1620-1623.
Chinese Application No. 201410444211.4 dated Sep. 18, 2017, along with an English translation thereof, further explaining the relevance of the reference discussed therein.
Chinese Application No. 201410444239.8 dated Sep. 28, 2017, along with an English translation thereof.
Chinese Application No. 201410444193.X dated Sep. 30, 2017, along with an English translation thereof.
Advanced Video Coding for Generic Audiovisual Services, ITU-T Recommendation H.264, ITU-T, Mar. 2005, pp. 50, 85-92, 226-234.
Context-Based Adaptive Binary Arithmetic Coding in the H.264/AVC Video Compression Standard, IEEE, pp. 620-636 (Jul. 2003).

\* cited by examiner

FIG.14
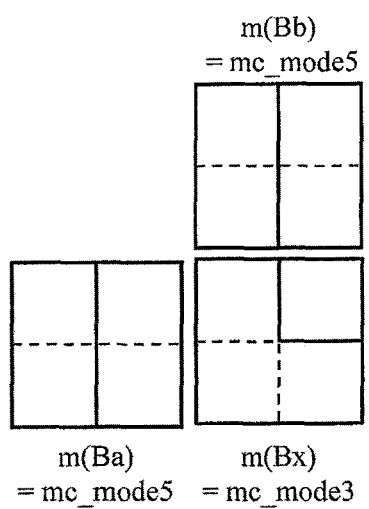
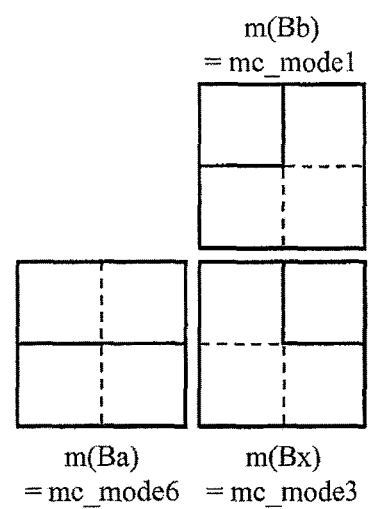
(a)　　　　　　　　　　　(b)

Binarization of mc_mode

| Motion Prediction Mode | Binarization Result | | | | | |
|---|---|---|---|---|---|---|
| | Bin 0 | Bin 1 | Bin 2 | Bin 3 | Bin 4 | Bin 5 |
| mc_skip | 0 | | | | | |
| mc_mode0 | 1 | 0 | | | | |
| mc_mode5 | 1 | 1 | 0 | 0 | | |
| mc_mode6 | 1 | 1 | 0 | 1 | | |
| mc_mode1 | 1 | 1 | 1 | 1 | 0 | 0 |
| mc_mode2 | 1 | 1 | 1 | 1 | 0 | 1 |
| mc_mode3 | 1 | 1 | 1 | 1 | 1 | 0 |
| mc_mode4 | 1 | 1 | 1 | 1 | 1 | 1 |
| mc_mode7 | 1 | 1 | 1 | 0 | | |

(b)

Binarization of sub_mc_mode

| Motion Prediction Mode | Binarization Result | | | | | |
|---|---|---|---|---|---|---|
| | Bin 0 | Bin 1 | Bin 2 | Bin 3 | Bin 4 | Bin 5 |
| sub_mc_skip | 0 | | | | | |
| sub_mc_mode0 | 1 | 0 | | | | |
| sub_mc_mode5 | 1 | 1 | 0 | 0 | | |
| sub_mc_mode6 | 1 | 1 | 0 | 1 | | |
| sub_mc_mode1 | 1 | 1 | 1 | 1 | 0 | 0 |
| sub_mc_mode2 | 1 | 1 | 1 | 1 | 0 | 1 |
| sub_mc_mode3 | 1 | 1 | 1 | 1 | 1 | 0 |
| sub_mc_mode4 | 1 | 1 | 1 | 1 | 1 | 1 |
| sub_mc_mode7 | 1 | 1 | 1 | 0 | | | ctx_mc_mode_bin0 = (A == mc_skip) + (B == mc_skip)
ctx_sub_mc_mode_bin0 = (A == skip) + (B == skip)

skip = (mc_skip || sub_mc_skip)

ctx_mc_mode_bin1 = (A == mc_mode0) + (B == mc_mode0)

ctx_sub_mc_mode_bin1 =
(A == sub_mc_mode0 || mc_mode0) + (B == sub_mc_mode0 || mc_mode0)

ctx_mc_mode_bin2 = (A != complex_mc_mode) + (B != complex_mc_mode)

ctx_sub_mc_mode_bin2 =
(A == complex_sub_mc_mode) + (B == complex_sub_mc_mode)

complex_mc_mode = (mc_mode1 || mc_mode2 || mc_mode3 || mc_mode4 || mc_mode7)
complex_sub_mc_mode = (sub_mc_mode1 || sub_mc_mode2 || sub_mc_mode3 || sub_mc_mode4 || sub_mc_mode7)

ctx_mc_mode_bin4 = (B == mc_h_part)

ctx_sub_mc_mode_bin4 = (B == sub_mc_h_part)

mc_h_part = (mc_mode3 || mc_mode4 || mc_mode6 || mc_mode7)

sub_mc_h_part = (sub_mc_mode3 || sub_mc_mode4 || sub_mc_mode6 || sub_mc_mode7)

ctx_mc_mode_bin5 = (A == mc_v_part)

ctx_sub_mc_mode_bin5 = (A == sub_mc_v_part)

mc_v_part = (mc_mode2 || mc_mode4 || mc_mode5 || mc_mode7)

sub_mc_v_part = (sub_mc_mode2 || sub_mc_mode4 || sub_mc_mode5 || sub_mc_mode7)

OPTIMIZED IMAGE DECODING DEVICE AND METHOD FOR A PREDICTIVE ENCODED BIT STREAM

This application is a Divisional of copending application Ser. No. 14/560,972 which is a Divisional of copending application Ser. No. 13/322,820, filed on Nov. 28, 2011, which was filed as PCT International Application No. PCT/JP2010/003553 on May 27, 2010, which claims the benefit under 35 U.S.C. § 119(a) to Patent Application No. 2009-130433, filed in Japan on May 29, 2009, all of which are hereby expressly incorporated by reference into the present application.

FIELD OF THE INVENTION

The present invention relates to an image encoding device, an image decoding device, an image encoding method, and an image decoding method which are used for an image compression encoding technique, a compressed image data transmission technique, etc.

BACKGROUND OF THE INVENTION

Conventionally, in international standard video encoding methods, such as MPEG and ITU-T H.26x, each input video frame is subjected to a compression process with the video frame being divided into macro blocks each of which consists of 16×16 pixel blocks.

On the other hand, in recent years, a technique of compression-encoding a high-definition high-quality video having a video format, such as a 4K×2K-pixel video format having a space resolution which is four times as high as that of HDTV (High Definition TeleVision, 1920×1080 pixels), a 8K×4K-pixel video format having a space resolution which is further increased to four times as high as that of the 4K×2K-pixel video format, or a 4:4:4 video signal format of increasing the number of sampled chrominance signals, thereby improving the color reproduction nature, has been desired. When compression-encoding such a high-definition high-quality video, it is impossible to perform an encoding process by using an image signal correlation in a 16×16 pixel macro block to a sufficient degree, and it is therefore difficult to provide a high compression ratio. In order to deal with this problem, for example, a technique of extending the size of each conventional 16×16 pixel macro block to a 32×32 pixel block, as disclosed in nonpatent reference 1, and increasing the unit to which a motion vector is allocated, thereby reducing the amount of encoded parameters required for prediction, or a technique of increasing the block size for the conversion encoding of a prediction error signal, thereby removing a correlation between pixels of the prediction error signal effectively, have been proposed.

FIG. 21 is a block diagram showing the structure of an encoding device disclosed in nonpatent reference 1. In encoding disclosed in nonpatent reference 1, a block dividing unit 1002 divides an inputted video signal 1001 which is a target to be encoded into macro blocks (rectangular blocks of a luminance signal each having 32 pixels×32 lines), and is inputted to a predicting unit 1004 as an encoded video signal 1003.

The predicting unit 1004 predicts an image signal of each color component in each macro block within each frame and between frames to acquire a prediction error signal 1005. Especially, when performing a motion-compensated prediction between frames, the predicting unit searches for a motion vector for each macro block itself or each of sub-blocks into which each macro block is further divided, creates a motion-compensated prediction image according to the motion vector, and acquires a prediction error signal 1005 by calculating the difference between the motion-compensated prediction image and the encoded video signal 1003.

After performing a DCT (discrete cosine transform) process on the prediction error signal 1005 to remove a signal correlation from the prediction error signal 1005 while changing the block size according to the size of a unit area to which the motion vector is allocated, a compressing unit 1006 quantizes the prediction error signal to acquire compressed data 1007. While the compressed data 1007 is entropy-encoded and outputted as a bit stream 1009 by a variable length encoding unit 1008, the compressed data is also sent to a local decoding unit 1010 and a decoded prediction error signal 1011 is acquired by this local decoding unit.

This decoded prediction error signal 1011 is added to a prediction signal 1012 which is used to create the prediction error signal 1005 to create a decoded signal 1013, and this decoded signal is inputted to a loop filter 1014. The decoded signal 1013 is stored in a memory 1016 as a reference image signal 1015 for creating a subsequent prediction signal 1012 after the decoded signal is subjected to a process of removing a block distortion by the loop filter 1014. A parameter 1017 used for the creation of the prediction signal, which is determined by the predicting unit 1004 in order to acquire the prediction signal 1012, is sent to the variable length encoding unit 1008, and is multiplexed into a bit stream 1009 and this bit stream is outputted. Information, such as intra prediction mode information showing how to perform a space prediction within each frame, and a motion vector showing an amount of inter-frame movement, is included in the parameter 1017 used for the creation of the prediction signal, for example.

While a conventional international standard video encoding method, such as MPEG or ITU-T H.26x, uses 16×16 pixels as the macro block size, the encoding device disclosed in nonpatent reference 1 uses 32×32 pixels as the macro block size (super macro block: SMB). FIG. 22 shows the shapes of divided regions to each of which a motion vector is allocated at the time of performing a motion-compensated prediction for each M×M pixel macro block, and FIG. 22(a) shows each SMB disclosed in nonpatent reference 1 and FIG. 22(b) shows each macro block based on conventional MPEG-4 AVC/H.264 (refer to nonpatent reference 2). While each SMB has a large area for each motion prediction region which is covered by a single motion vector with the number of pixels M=32, each conventional macro block uses the number of pixels M/2=16. As a result, because in the case of SMBs the amount of information of the motion vector which is needed for the entire screen decreases compared with the case of conventional macro blocks having the number of pixels M/2=16, the amount of motion vector code which should be transmitted as a bit stream can be reduced.

RELATED ART DOCUMENT

Nonpatent Reference

Nonpatent reference 1: Siwei Ma and C.-C. Jay Kuo, "High-definition Video Coding with Super-macroblocks", Proc. SPIE, Vol. 6508, 650816 (2007)
Nonpatent reference 2: MPEG-4 AVC (ISO/IEC 14496-10)/H.ITU-T 264 standards

SUMMARY OF THE INVENTION

In the conventional methods disclosed in nonpatent references 1 and 2, a special mode called a skip mode in which any data which should be encoded for a motion vector and a prediction error signal does not occur at all as a result of the above-mentioned motion prediction is disposed. For example, in nonpatent reference 2, a case in which "the motion vector matches its predicted value, and all the transform coefficients of the prediction error signal are zero" is defined as a skip mode. Furthermore, the skip mode can be selected only when the region to which the motion vector is allocated has the same size as a macro block. Therefore, when the macro block size is enlarged as shown in nonpatent reference 1, the skip mode is set only to a motion prediction block having a maximum size. A problem is therefore that the skip mode is not applied to any motion prediction block having a size smaller than the maximum size, and hence it is difficult to improve the efficiency of the encoding.

The present invention is made in order to solve the above-mentioned problem, and it is therefore an object of the present invention to provide an image encoding device which implements a video encoding method having good load balance, of removing a signal correlation more effectively according to the statistical and local properties of a video signal which is a target to be encoded and performing efficient information compression, thereby improving the optimality for encoding of an ultra-high-definition video signal, and a method of implementing the image encoding device, and an image decoding device and an image decoding method.

In accordance with the present invention, there is provided an image encoding device including: a predicting unit for adaptively determining a size of a motion prediction unit block in each macro block according to a predetermined condition, and for dividing the above-mentioned motion prediction unit block into motion vector allocation regions to search for a motion vector; and an encoding unit for, when a motion vector is allocated to a whole of the motion prediction unit block, performing encoding in a first skip mode if the above-mentioned motion vector is equal to an estimated vector which is determined from motion vectors in surrounding motion prediction unit blocks and data to be encoded as a motion prediction error signal does not exist, and for, when each of the motion vector allocation regions has a size equal to or larger than a predetermined size and a motion vector is allocated to a whole of each of the motion vector allocation regions, performing encoding in a second skip mode if the above-mentioned motion vector is equal to an estimated vector which is determined from motion vectors in surrounding motion vector allocation regions and data to be encoded as a motion prediction error signal does not exist.

In accordance with the present invention, there is provided an image decoding device including: a decoding unit for decoding a bit stream to acquire data showing a size of a motion prediction unit block in each macro block, a motion prediction mode for specifying a shape of each of motion vector allocation regions into which the motion prediction unit block is divided, and a motion vector corresponding to each motion vector allocation region, and for determining whether or not the motion prediction unit block is in a first skip mode and whether or not one of the motion vector allocation regions is in a second skip mode from the above-mentioned motion prediction mode; and a predicting unit for, when the motion prediction unit block is in the first skip mode or one of the motion vector allocation regions is in the second skip mode, determining an estimated vector from surrounding motion vectors, and setting this estimated vector as a motion vector and also setting all motion prediction error signals to zero to create a prediction image, and for, when the motion prediction unit block is not in the first skip mode and the motion vector allocation regions of the above-mentioned motion prediction unit block are not in the second skip mode, creating a prediction image on a basis of the motion prediction mode and the motion vector which the decoding unit acquires by decoding the bit stream.

In accordance with the present invention, there is provided an image encoding method including: a predicting step of adaptively determining a size of a motion prediction unit block in each macro block according to a predetermined condition, and dividing the above-mentioned motion prediction unit block into motion vector allocation regions to search for a motion vector; and an encoding step of, when a motion vector is allocated to a whole of the motion prediction unit block, performing encoding in a first skip mode if the above-mentioned motion vector is equal to an estimated vector which is determined from motion vectors in surrounding motion prediction unit blocks and data to be encoded as a motion prediction error signal does not exist, and of, when each of the motion vector allocation regions has a size equal to or larger than a predetermined size and a motion vector is allocated to a whole of each of the motion vector allocation regions, performing encoding in a second skip mode if the above-mentioned motion vector is equal to an estimated vector which is determined from motion vectors in surrounding motion vector allocation regions and data to be encoded as a motion prediction error signal does not exist.

In accordance with the present invention, there is provided an image decoding method including: a decoding step of decoding a bit stream to acquire data showing a size of a motion prediction unit block in each macro block, a motion prediction mode for specifying a shape of each of motion vector allocation regions into which the motion prediction unit block is divided, and a motion vector corresponding to each motion vector allocation region, to determine whether or not the motion prediction unit block is in a first skip mode and whether or not one of the motion vector allocation regions is in a second skip mode from the above-mentioned motion prediction mode; a skip mode predicting step of, when the motion prediction unit block is in the first skip mode or one of the motion vector allocation regions is in the second skip mode, determining an estimated vector from surrounding motion vectors, and setting this estimated vector as a motion vector and also setting all motion prediction error signals to zero to create a prediction image; and a predicting step of, when the motion prediction unit block is not in the first skip mode and the motion vector allocation regions of the motion prediction unit block are not in the second skip mode, decoding the bit stream to acquire data showing the motion vector corresponding to each motion vector allocation region to create a prediction image on a basis of the above-mentioned motion vector and the motion prediction mode which is acquired by decoding the bit stream in the decoding step.

According to the present invention, because the first skip mode and the second skip mode are set up for each motion prediction unit block and its motion vector allocation regions, respectively, the image encoding device and the image decoding device can be constructed in such a way as to be able to express a hierarchy of skip modes when encoding and decoding a video signal having the 4:4:4 format and be adaptive to the characteristics of a temporal change of each color component signal with flexibility. Therefore, the image encoding device can perform an optimal encoding process on the video signal having the 4:4:4 format.

BRIEF DESCRIPTION OF THE FIGURES

FIG. 14 is a view explaining a difference in the correlation in a motion prediction mode, and FIGS. 14(*a*) and 14(*b*) show two states of the motion prediction mode which are selected for basic blocks $B_a$ and $B_b$, respectively;

FIG. 15 is a view showing a result of binarization of the motion prediction mode which is carried out by a binarization unit shown in FIG. 10;

EMBODIMENTS OF THE INVENTION

Embodiment 1

Hereafter, the preferred embodiments of the present invention will be explained in detail with reference to the drawings.

In this embodiment, an image encoding device which performs compression of a digital video signal having a 4:4:4 format inputted thereto and which is adapted for the state of a signal of each color component to perform a motion compensation prediction process, and an image decoding device which performs extension of a digital video signal having a 4:4:4 format and which is adapted for the state of a signal of each color component to perform a motion compensation prediction process will be described.

Figure 1:
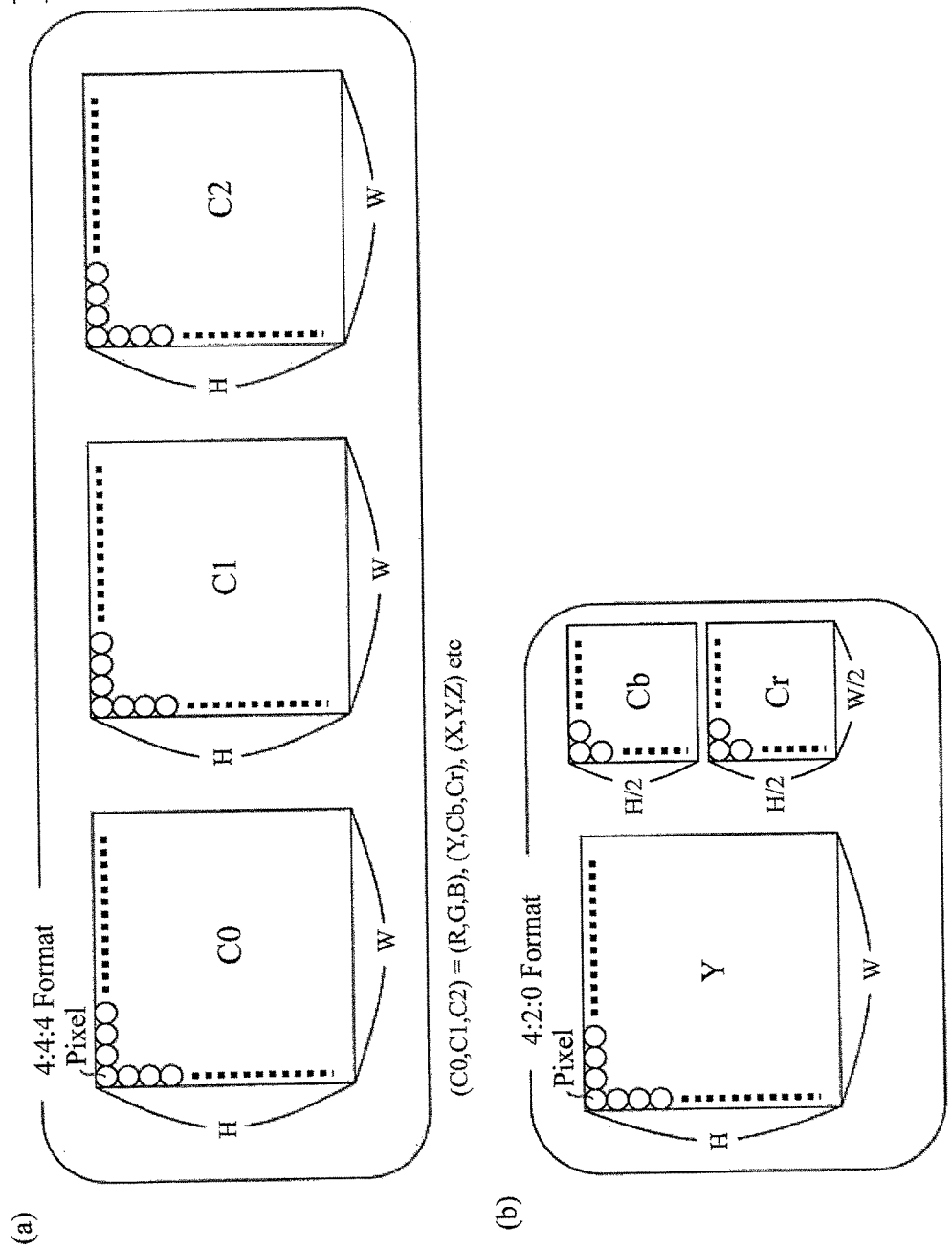
FIG. 1 is a view showing the 4:4:4 format which is a target to be processed by an image encoding device and an image decoding device in accordance with Embodiment 1.

FIG. 1 shows the 4:4:4 format which the image encoding device and the image decoding device in accordance with Embodiment 1 use as the format of an input. The 4:4:4 format denotes a format in which, as shown in FIG. 1(*a*), the pixel numbers of three signal components C0, C1, and C2 which construct a color moving image are the same as one another. The color space of the three signal components can be RGB or XYZ, or can be brightness and color difference (YUV, YCbCr, or YPbPr). In contrast with the 4:4:4 format, a 4:2:0 format as shown in FIG. 1(*b*) denotes a format in which the color space is YUV, YCbCr, or YPbPr, and each of color difference signal elements (e.g. Cb and Cr in the case of YCbCr) has pixels in each of a horizontal direction W and a vertical direction H whose number is half that of the brightness Y in each of the horizontal direction and the vertical direction.

The image encoding device and the image decoding device will be explained hereafter by especially limiting to an example of using a method of performing processes by assuming that the color space of the 4:4:4 format is YUV, YCbCr, or YPbPr, and each color component is equivalent to a brightness component. However, it is needless to say that operations which will be explained hereafter can be applied directly to the brightness signal even when the image encoding device and the image decoding device deal with a video signal having the 4:2:0 format.

1. Image Encoding Device

Figure 2:
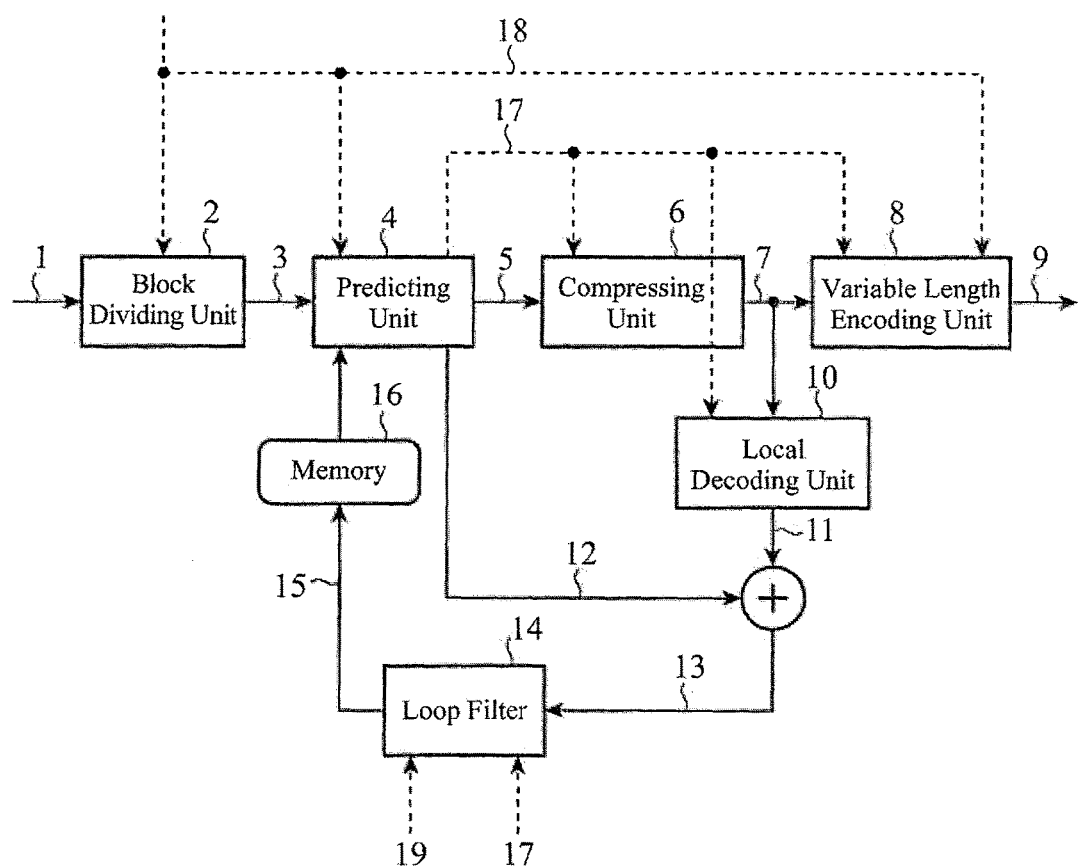
FIG. 2 is a block diagram showing the structure of the image encoding device in accordance with Embodiment 1.

FIG. 2 is a block diagram showing the structure of the image encoding device in accordance with Embodiment 1.

The image encoding device shown in FIG. 2 is constructed in such a way as to divide each inputted video frame having the 4:4:4 format into blocks each having a predetermined size, i.e. blocks each having $M_{max} \times M_{max}$ pixels (each block is referred to a "reference block" from here on), and perform a motion prediction on each of the reference blocks to compression-encode a prediction error signal.

Figure 3:
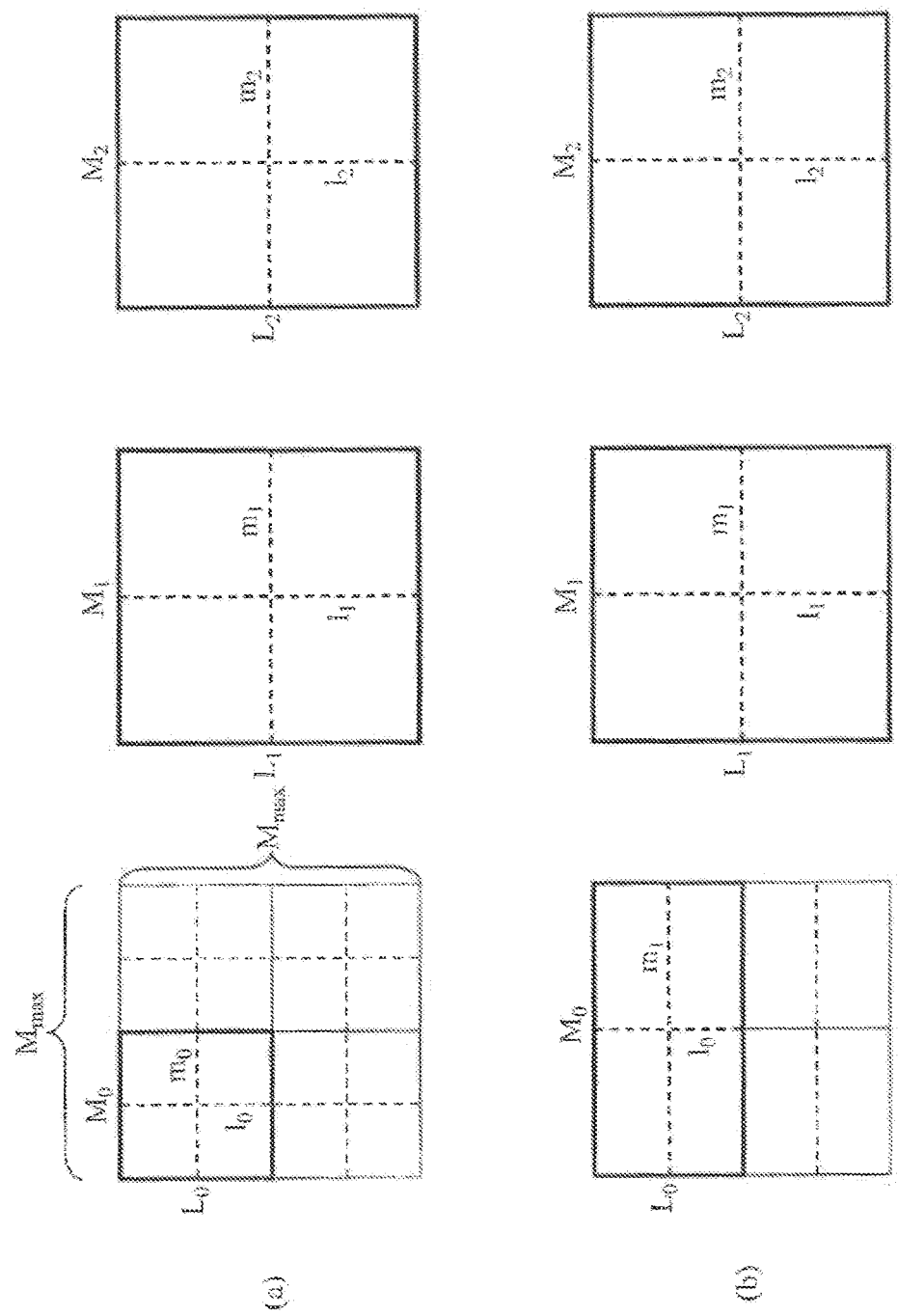
FIG. 3 is an explanatory drawing showing a reference block which a block dividing unit shown in FIG. 2 creates.

First, an inputted video signal 1 which is the target to be encoded is divided into reference blocks by a block dividing unit 2, and these blocks are inputted to a predicting unit 4 as an encoded signal 3. Each reference block created by the block dividing unit 2 is shown in FIG. 3. As shown in FIG. 3, each reference block is constructed as reference block data which is a unit in which rectangular blocks consisting of $M_{max} \times M_{max}$ pixels are collected. Although mentioned later in detail, the reference block size $M_{max}$ is determined and encoded at an upper layer data level, such as a frame, a sequence, or a GOP (Group Of Pictures). The reference block size $M_{max}$ can be changed within each frame. In this case, the reference block size $M_{max}$ is specified for each slice or the like in which a plurality of macro blocks are collected.

Each reference block data is further divided into one or more "motion prediction unit blocks" which are $L_i \times M_i$ pixel blocks (i: color component identifier), and the motion prediction and the encoding are performed by defining each motion prediction unit block as a base. A pattern of motion prediction unit blocks shown in FIG. 3(*a*) has $L_0 = M_{max}/2$ and $M_0 = M_{max}/2$, and a pattern of motion prediction unit blocks shown in FIG. 3(*b*) has $L_0 = M_{max}/2$ and $M_0 = M_{max}$. In both of FIGS. 3(*a*) and 3(*b*), $L_1 = M_1 = L_2 = M_2 = M_{max}$. In the following explanation, it is assumed that the reference blocks of each color component having the 4:4:4 format are the same in size among the three color components C0, C1, and C2, and, when the reference block size $M_{max}$ is changed, the reference block size is changed to an identical size for all the three color components. In addition, each of the sizes $L_i$ and $M_i$ of motion prediction unit blocks can be selectably determined for each of the color components C0, C1, and C2, and can be changed in units of a sequence, a GOP, a frame, a reference block, or the like. Using this structure, the motion prediction unit block sizes $L_i$ and $M_i$ can be determined with flexibility according to a difference in the properties of the signal of each color component without having to change the reference block size $M_{max}$. Efficient implementation in consideration of parallelization and pipelining of the encoding and decoding processing carried out in units of a reference block can be established.

The predicting unit 4 carries out a motion-compensated prediction of the image signal of each color component in each reference block to acquire a prediction error signal (motion prediction error signal) 5. Because the operation of the predicting unit 4 is a feature of the image encoding device in accordance with this Embodiment 1, the operation of the predicting unit will be mentioned later in detail. After performing a transforming process, such as a DCT process, on the prediction error signal 5 to remove a signal correlation from this prediction error signal, a compressing unit 6 quantizes the prediction error signal to acquire prediction error compressed data 7. At this time, the compressing unit 6 performs orthogonal transformation and quantization, such as DCT, on the prediction error signal 5, and outputs the prediction error compressed data 7 to a variable length encoding unit (encoding unit) 8 and a local decoding unit 10.

The variable length encoding unit 8 entropy-encodes the prediction error compressed data 7, and outputs the entropy-encoded prediction error compressed data as a bit stream 9. The local decoding unit 10 acquires a decoded prediction error signal 11 from the prediction error compressed data 7. This decoded prediction error signal 11 is added to a prediction signal (prediction image) 12 which is used for the creation of the prediction error signal 5 by an adder unit, so that a decoded signal 13 is created and is inputted to a loop filter 14. Parameters 17 for prediction signal creation, which are determined by the predicting unit 4 in order to acquire the prediction signal 12, are sent to the variable length encoding unit 8, and are outputted as the bit stream 9. The descriptions of the parameters 17 for prediction signal creation will be explained in greater detail hereinafter together with an explanation of the predicting unit 4. Furthermore, because a method of encoding the parameters 17 for prediction signal creation which the variable length encoding unit 8 uses is a feature of this Embodiment 1, the encoding method will be explained later in detail.

The loop filter 14 performs a block distortion rejection filtering process on the decoded signal 13 onto which a block distortion occurring as a result of transform coefficient quantization by the compressing unit 6 is piggybacked by using both the parameters 17 for prediction signal creation and quantization parameters 19. The decoded signal 13 is stored in a memory 16 as a reference image signal 15 for creating a subsequent prediction signal 12 after the decoded signal is subjected to a process of removing encoding noise by the loop filter 14.

In the video encoding methods disclosed in nonpatent references 1 and 2, when each reference block is defined as a macro block, a method of encoding each frame while selecting intra-frame coding or inter-frame predictive coding for each macro block is typically used. This is because when the inter-frame motion prediction is not sufficient, the use of a correlation between frames can further improve the efficiency of the encoding. Hereinafter, in the image encoding device in accordance with this Embodiment 1, although any description about the intra-frame coding and the selectively use of the intra-frame coding is not expressly stated in this specification when explaining the point of the present invention, the image encoding device can be constructed in such a way as to be able to selectively use the intra-frame coding for each reference block, except where specifically noted. In the image encoding device in accordance with this Embodiment 1, although each reference block can be defined as a macro block, the term reference block will be used hereafter for explanation of a motion prediction.

Hereafter, the operation of the predicting unit 4 which is a feature of this Embodiment 1 will be explained in detail. The predicting unit 4 in accordance with this Embodiment 1 has the following three features.

Figure 4:
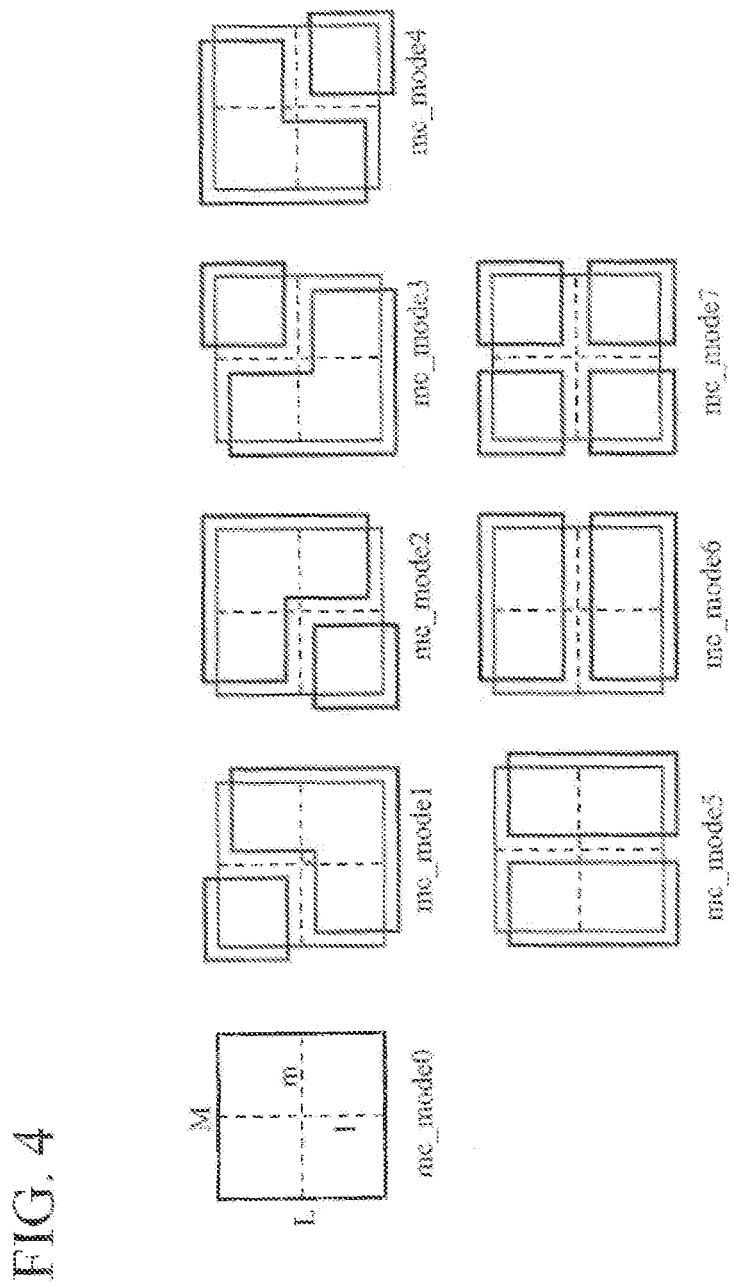
FIG. 4 is an explanatory drawing showing examples of shapes into which a predicting unit shown in FIG. 2 divides a set of motion prediction unit blocks, each of the shapes consisting of one or more basic blocks.

(1) Adaptation of the reference block size and the motion prediction unit block size in connection with adaptation of the shape of each divided region used for motion prediction (2) Determination of a motion prediction mode and a motion vector according to the properties of each color component (3) Adaptive skip mode selection based on the reference block size and the motion prediction unit block size As to above-mentioned (1), the predicting unit 4 divides each reference block into one or more motion prediction unit blocks each having $L_i \times M_i$ pixels according to the properties of the signal of each color component, and further divides each motion prediction unit block into a plurality of shapes each of which consists of a combination of one or more blocks each having $l_i \times m_i$ pixels. The predicting unit 4 then performs a prediction by allocating a specific motion vector to each divided region, selects the plurality of shapes which provide the most predictive efficiency as the motion prediction mode, and then performs a motion prediction on each divided region by using the motion vector acquired as a result of the selection to acquire a prediction error signal 5. Each of the divided shapes in each motion prediction unit block can be constructed of a combination of one or more "basic blocks" each of which consists of $l_i \times m_i$ pixels. In the image encoding device in accordance with this Embodiment 1, the following constraints: "$m_i=M_i/2$" and "$l_i=L_i/2$" are provided between $M_i$ and $m_i$ and between $L_i$ and $l_i$, respectively. The divided shapes each consisting of one or more basic blocks which are determined according to these requirements are shown in FIG. 4. FIG. 4 is an explanatory drawing showing examples of the shapes in which the predicting unit 4 divides each motion prediction unit block into units each of which consists of one or more basic blocks. Hereafter, in the image encoding device of this Embodiment 1, it is assumed that the patterns (division patterns) mc_mode0 to mc_mode7 of divided shapes shown in FIG. 4 are common among the three color components. As an alternative, the division patterns mc_mode0 to mc_mode7 can be determined independently for each of the three color components. Hereafter, these division patterns mc_mode0 to mc_mode7 are referred to as "motion prediction modes".

In the video encoding methods disclosed in nonpatent references 1 and 2, the shape of each motion prediction application region is limited to a rectangle, and such a diagonal division as shown in FIG. 4 of each reference block into regions including a region other than a rectangular region cannot be used. In contrast with this, in accordance with this Embodiment 1, because the shape of each divided region, as shown in FIG. 4, to which a motion prediction is applied is diversified, when a complicated movement, such as the outline of a moving object, is included in a reference block, a motion prediction can be carried out with a smaller number of motion vectors than that used in the case of a rectangular division.

Furthermore, "S. Kondo and H. Sasai, "A Motion Compensation Technique using Sliced Blocks and its Application to Hybrid Video Coding", VCIP 2005, July 2005" discloses a method of diversifying the shapes of regions into which a conventional macro block is divided, and to each of which a motion prediction is applied. In this reference, the divided shapes are expressed by intersection positions each between a line segment used for the macro block division, and a block border. However, because this method increases the number of division patterns in each reference block while fixing the pixel number M, the following problems arise.

Problem 1:

The code amount for describing the division patterns of each reference block increases. When an arbitrary $m_i$ meeting $M_{max}$ mod $m_i=0$ is permitted, the number of division patterns in each reference block increases and it becomes necessary to encode information for specifying each of the division patterns as overhead information. Because the probability that each certain specific division pattern occurs disperses as the number of division patterns increases, the entropy encoding of the division patterns becomes inefficient and becomes an overhead as a code amount, and the total encoding ability reaches its limit.

Problem 2:

As the number of division patterns increases, the amount of arithmetic operation required to select a division optimal at the time of the encoding increases. Because the motion prediction is a heavy load process which occupies a large percentage of the encoding processing load, the conventional image encoding device has no other choice but to be designed in such a way as to verify and use only a specific division pattern among the plurality of division patterns if the conventional image encoding device uses an algorithm which increases the number of division patterns blindly. Therefore, there is a case in which the conventional image encoding device cannot make full use of the original ability which the algorithm has.

In contrast with this, the approach shown in FIG. 4 of the image encoding device of this Embodiment 1 solves the above-mentioned problems by using the following three methods: the first method (1) of enabling a change of the value of $M_{max}$ at an upper level, such as a frame, according to the requirements on the encoding, and the resolution and properties of the video signal; the second method (2) of enabling a division of each $M_{max} \times M_{max}$ reference block into one or more $L_i \times M_i$ pixel motion prediction unit blocks according to the characteristics of each color component $C_i$; and the third method (3) of securing variations of division while limiting the requirements on the division of each motion prediction unit block into basic blocks to a division having divided shapes which satisfy the following constraints: "$m_i=M_i/2$" and "$l_i=L_i/2$". The value of the size $M_{max}$ of the basic blocks is not changed locally within each frame or each slice, and can be changed only at a higher order data structure level, such as a frame level or a frame sequence (a sequence or a GOP). This mechanism enables adaptation to a difference in the meaning of the image signal pattern included in each reference block. For example, in a video having a small resolution (Video Graphics Array: VGA, or the like) and a video having a large resolution (HDTV or the like), their signal patterns in each $M_{max} \times M_{max}$ pixel block having the same size express different meanings. When predicting an identical object to be shot, while a signal pattern close to the structure of the object to be shot is captured in a video having a small resolution, a signal pattern of a further local portion of the object to be shot is simply captured in a video having a large resolution even if the same block size as that in the case of the video having a small resolution is used. Therefore, when the reference block size does not change depending on the resolution, the signal pattern within each reference block has a larger noise component as the resolution increases, and therefore it becomes impossible to improve the ability of motion prediction as a pattern matching technology.

Therefore, by enabling a change of the value of the reference block size $M_{max}$ only at a high order data structure level, while the code amount required for the signaling of the value of the reference block size $M_{max}$ can be reduced, the signal pattern included in each reference block can be optimized according to the conditions, such as the resolution and scene changes of the video, and activity changes of the entire screen from the viewpoint of the motion prediction. In addition to this mechanism, by enabling a change of the division pattern within each motion prediction unit block for each color component, as shown in FIG. 3, the unit to be processed for the motion prediction can be optimized according to the signal characteristics of each color component. In addition, by providing restricted flexibility of the division patterns to each motion prediction unit block, as shown in FIG. 4, while the code amount required to express the division patterns within each motion prediction unit block is reduced, the whole efficiency of the motion prediction can be improved. Furthermore, by carrying out the process of determining the value of the reference block size $M_{max}$ at a frame level with efficiency, the variations of division pattern which should be checked within each reference block after that can be reduced compared with the conventional technologies, and the load on the encoding process can be reduced.

As the method of determining the value of the reference block size $M_{max}$, for example, there are methods as follows.

The first method (1) of determining the value of the reference block size $M_{max}$ according to the resolution of the video to be encoded. In the case of the same $M_{max}$ value, a video having a large resolution represents that an image signal pattern in each reference block has a more significant noise component, and it becomes difficult for a motion vector to capture the image signal pattern. In such a case, the $M_{max}$ value is increased to enable a motion vector to capture the image signal pattern.

The second method (2) of assuming that whether or not the difference between frames is large is an activity, and, when the activity is large, performing the motion prediction with a small $M_{max}$ value, whereas when the activity is small, performing the motion prediction with a large $M_{max}$ value. Furthermore, the size control at this time is determined according to the frame rate of the video to be encoded. Because as the frame rate increases, an inter frame correlation becomes large, the dynamic range of the motion vector itself becomes small and hence the code amount becomes small, a method of setting the $M_{max}$ value to a large value in such a way that this value does not become excessive even if the activity is somewhat small to make it possible to predict up to a fine movement can be considered, for example.

The third method (3) of combining the methods (1) and (2) by weighting these methods to determine the value of the reference block size $M_{max}$.

After the value of the reference block size $M_{max}$ is determined, the sizes $L_i$ and $M_i$ of each motion prediction unit block for each color component is determined. For example, in the case in with which the inputted video signal 1 is defined in the color space of YUV (or YCbCr or the like), the U/V component which is a chrominance signal has a narrow signal band compared with the Y component of the brightness signal. Therefore, a variance within the blocks becomes small compared with that of the brightness. An example of a determination criterion by which to determine the sizes $L_i$ and $M_i$ of the U/V component in such a way that they are larger than the sizes $L_i$ and $M_i$ of the Y component of the brightness signal on the basis of the fact that a variance within the blocks becomes small compared with that of the brightness can be considered (refer to FIG. 3).

The values of the block sizes $M_{max}$, $L_i$, and $M_i$ acquired as the result of having performing these determinations are notified to the block dividing unit 2, the predicting unit 4, and the variable length encoding unit 8 as reference block size information 18. By simply setting $L_i$ and $M_i$ as derivable values with respect to $M_{max}$ through simple arithmetic operations, as shown in FIG. 3, what is necessary is just to encode the identifiers of computation expressions instead of encoding $L_i$ and $M_i$ as independent values. Therefore, the code amount required for the reference block size information 18 can be reduced.

Although not illustrated particularly in FIG. 2, the image encoding device can be constructed in such a way as to include a reference block size determining unit for determining the values of $M_{max}$, $L_i$, and $M_i$, and notifying these values to each unit, and determine the reference block size information 18.

Figure 5:
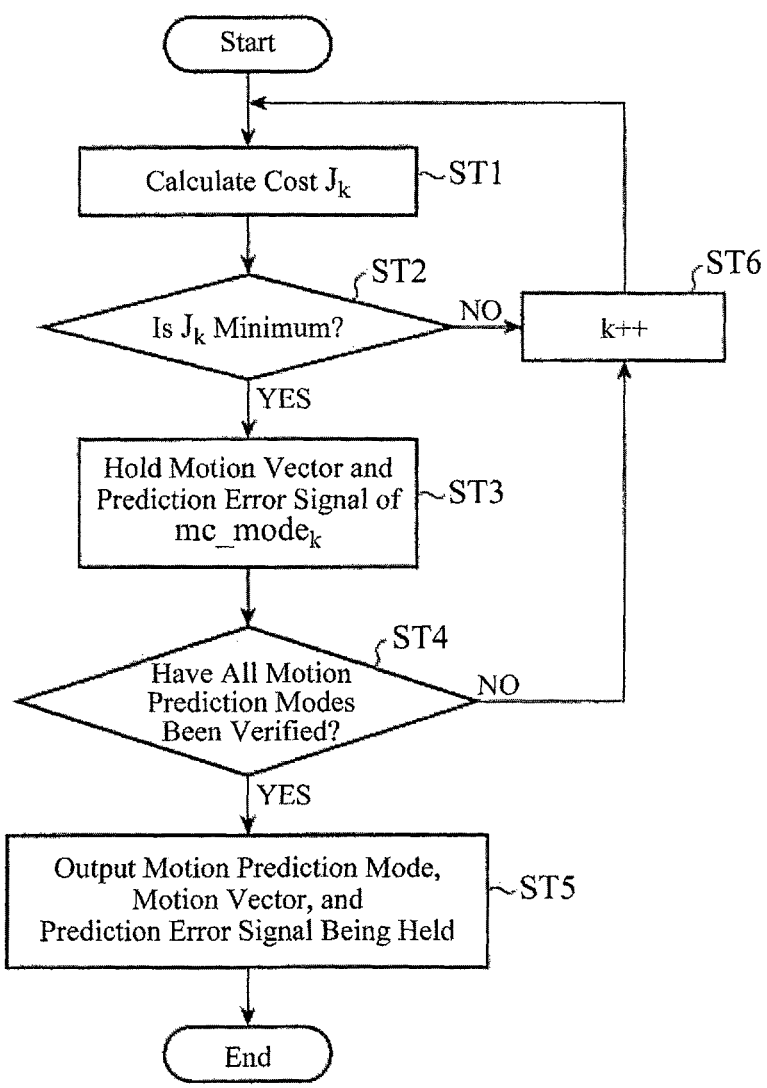
FIG. 5 is a flow chart showing the operation of the predicting unit shown in FIG. 2.

The predicting unit 4 performs a motion detection process using the division patterns shown in FIGS. 3 and 4 according to the motion prediction unit block sizes $L_i$ and $M_i$ which are derived from the reference block size information 18. FIG. 5 is a flow chart showing the operation of the predicting unit 4. The predicting unit 4 carries out a motion prediction of the $C_i$ component of the frame in units of a motion prediction unit block having $L_i \times M_i$ pixels. Fundamentally, in this process, the predicting unit detects an optimum motion vector in each divided region within a specified movement search range for each of the division patterns mc_mode0 to mc_mode7 shown in FIG. 4, and finally determines which one of the division patterns mc_mode0 to mc_mode7 should be used for the motion prediction unit block in question to provide the highest predictive efficiency.

The predictive efficiency is defined by the following cost J which is derived from both the total code amount R of motion vectors within the motion prediction unit block, and the amount D of prediction error between the prediction signal 12, which is created from the reference image stored in the memory 16 by an application of the above-mentioned motion vectors, and the inputted video signal 1. The predicting unit 4 is constructed in such a way as to output the motion prediction mode and the motion vector which minimize this cost J.

$$J=D+\lambda R(\lambda: \text{constant}) \tag{1}$$

Figure 6:
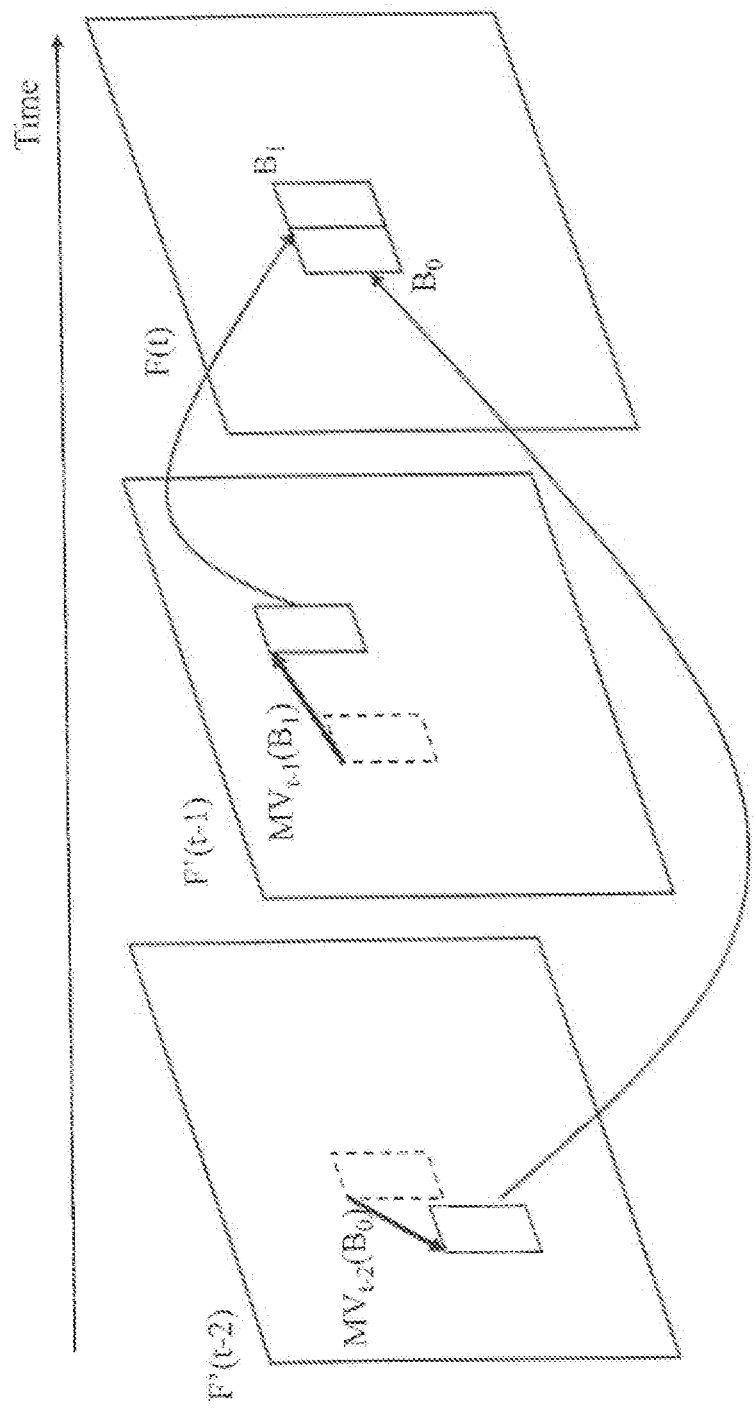
FIG. 6 is a view for explaining a method of calculating a cost J which is executed by the predicting unit.

Therefore, the predicting unit 4 calculates the cost $J_k$ for each motion prediction mode mc_mode$_k$ first (step ST1). With reference to FIG. 6, a method of calculating the cost J will be explained by taking the case of mc_mode5 as an example. At this time, the motion prediction unit block which is a target to be predicted in the frame F(t) consists of two divided regions $B_0$ and $B_1$. Furthermore, it is assumed that two reference images F'(t−1) and F"(t−2) which have been already encoded and local-decoded are stored in the memory 16, and the predicting unit can carry out a motion prediction using the two reference images F'(t−1) and F'(t−2) for the divided regions $B_0$ and $B_1$. In the example of FIG. 6, the predicting unit detects a motion vector $MV_{t-2}(B_0)$ using the reference image F'(t−2) for the divided region $B_0$, and also detects a motion vector $MV_{t-1}(B_1)$ using the reference image F'(t−1) for the divided region $B_1$. When each divided region is expressed as B, the pixel value at the position x=(i,j) in the screen of the n-th frame is expressed as $S_n(x)$, and the motion vector is expressed as v, the amount D of prediction error of the divided region B can be calculated using the sum of absolute differences (SAD) according to equation (2) shown below.

$$D = \sum_{x \in B} |S_n(x) - S_{n-1}(x+v)| \tag{2}$$

From the amounts $D_0$ and $D_1$ of prediction error corresponding to the divided regions $B_0$ and $B_1$, each of which is acquired as the result of the calculation using the above-mentioned equation (2), the amount D of prediction error is determined as $D=D_0+D_1$.

On the other hand, as to a total code amount R, the predicting unit uses estimated vectors PMV ($B_0$) and PMV ($B_1$) to acquire motion vector prediction differences MVD ($B_0$) and MVD($B_1$) according to an equation (3) shown below, and then carries out code amount conversion of these values to acquire code amounts $R_0$ and $R_1$ and determine the total code amount $R=R_0+R_1$.

$$MVD(B_0)=MV_{t-2}(B_0)-PMV(B_0)$$

$$MVD(B_1)=MV_{t-1}(B_1)-PMV(B_1) \tag{3}$$

Figure 7:
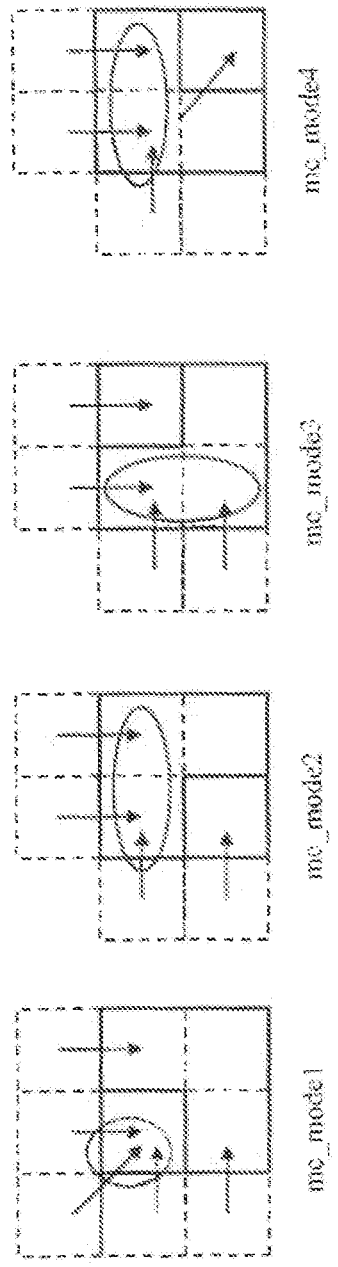
FIG. 7 is a view showing an example of determination of an estimated vector PMV in each of motion prediction modes mc_mode1 to mc_mode4 which is carried out by the predicting unit.

As a result, the cost J is determined. The predicting unit 4 calculates the cost J of each of all the motion vectors which are targets to be examined in the search range, and determines the solution which provides the smallest cost J as the division pattern of mc_mode5. An example of the determination of the estimated vectors PMV in mc_mode1 to mc_mode4 is shown in FIG. 7. In FIG. 7, each arrow means a motion vector MV in a surrounding or adjacent region which is used for the derivation of the estimated vector, and a median of three motion vectors MV enclosed by ○ is defined as the estimated vector PMV of the divided region indicated by the median.

When k=7, i.e., mc_mode7, is selected for each $L_i \times M_i$ pixel block, each of the motion prediction modes corresponding to the modes of mc_mode0 to mc_mode7 is selected for each of the $l_i \times m_i$ pixel blocks. The modes at this time are named as sub_mc_mode0 to sub_mc_mode7, respectively, for convenience' sake. A process of determining sub_mc_mode for each of the $l_i \times m_i$ pixel blocks is carried out according to the process flow of FIG. 5, and the cost $J_7$ in mc_mode7 in the corresponding $L_i \times M_i$ pixel block is the sum total of costs acquired using sub_mc_mode determined for each of the $l_i \times m_i$ pixel blocks.

Next, the predicting unit 4 verifies whether or not the cost $J_k$ in mc_mode$_k$ which the predicting unit has determined in this way is smaller than the costs in mc_mode$_{k-1}$, mc_mode$_{k-2}$, and . . . which it has verified until now (step ST2), and, when the cost $J_k$ in mc_mode$_k$ is smaller than the cost in mc_mode$_k$ which it has verified until now (if "Yes" in step ST2), holds mc_mode$_k$ as the motion prediction mode which is assumed to be optimal until that time, and also holds the motion vector and the prediction error signal determined at that time (step ST3). After finishing verifying all the motion prediction modes (if "Yes" in step ST4), the predicting unit 4 outputs the motion prediction mode, the motion vector, and the prediction error signal 5 which the predicting unit has been holding until now as a final solution (step ST5). Otherwise (if "No" in step ST2 or if "No" in step ST4), the predicting unit, in step ST6, increments the variable k, and then returns to step ST1 and verifies the next motion prediction mode.

Figure 8:
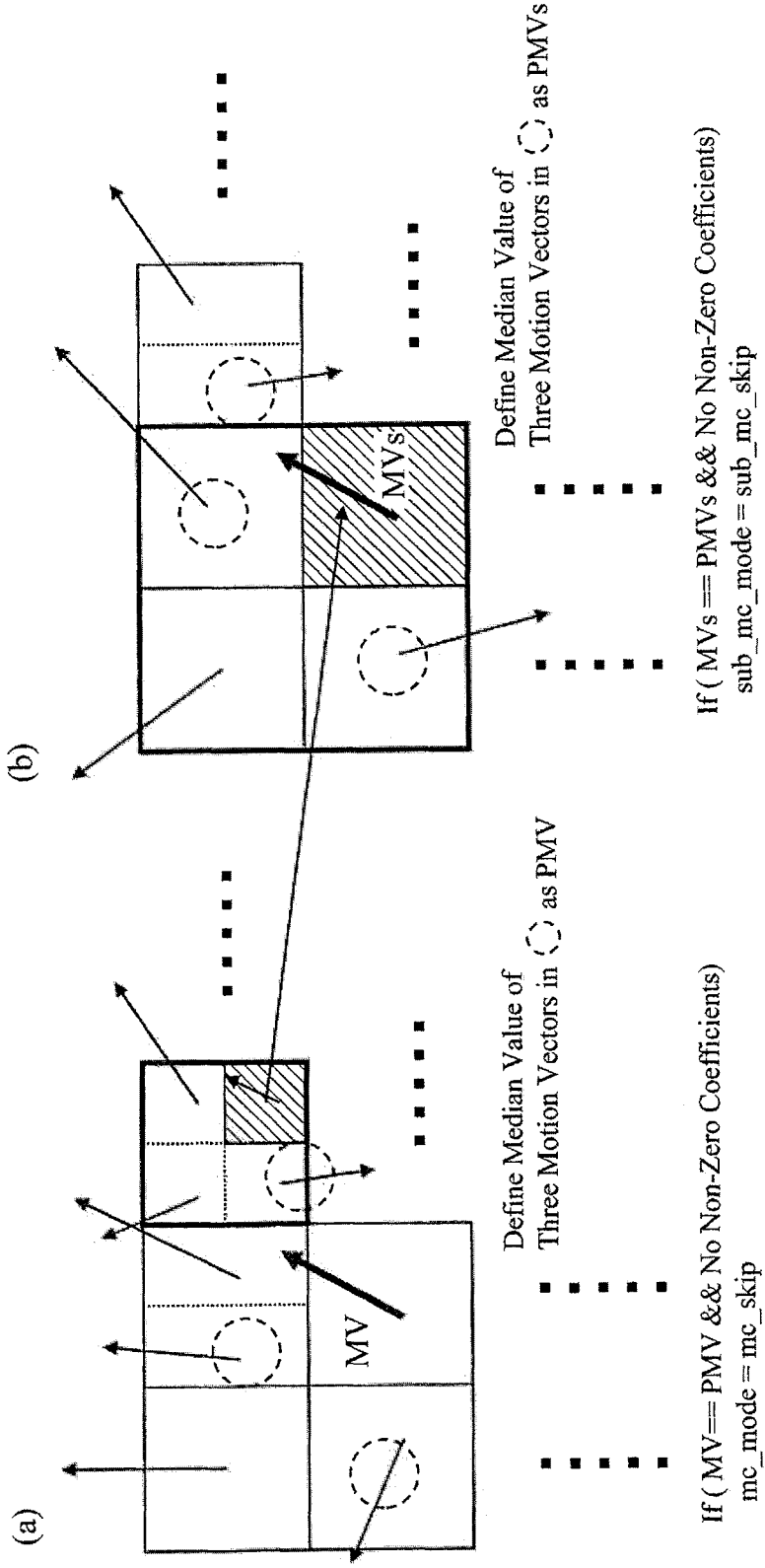
FIG. 8 is a view for explaining a skip mode.

In each of a motion prediction mode corresponding to mc_mode0 and motion prediction modes corresponding to sub_mc_mode0, a case in which the motion vector matches the estimated vector (the prediction difference to be encoded is zero) and all the coefficients of the transformed and quantized prediction error signal are zero is defined as a special skip mode. Hereafter, the skip mode corresponding to mc_mode0 is called mc_skip mode (a first skip mode), and the skip mode corresponding to sub_mc_mode0 is called sub_mc_skip mode (a second skip mode). FIG. 8 is a view for explaining the skip modes, and FIG. 8(*a*) shows an example in which each rectangle enclosed as a solid line denotes a motion prediction unit block, and its motion vector is denoted by MV. At this time, the predicting unit calculates an estimated vector PMV in a motion prediction unit block by using, for example, the motion vectors in surrounding or adjacent motion prediction unit blocks, as shown in FIG. 8. Because the encoding of the motion vector is done by encoding the prediction difference value between the motion vector and the estimated vector, this motion prediction unit block is assumed to be in mc_skip mode in case that the prediction difference is zero (MV==PMV) and the prediction error signal 5 has no non-zero coefficients to be encoded. Furthermore, FIG. 8(*b*) is an enlarged display of a part of FIG. 8(*a*) with the hatched basic block shown in FIG. 8(*a*) being centered in the enlarged figure, and a thick line frame shows a motion prediction unit block region. In this case, sub_mc_mode of the target basic block is sub_mc_mode0. When the motion vector at this time is expressed as MVs and the estimated vector at this time is expressed as PMVs, the motion prediction mode which is applied to this basic block is assumed to be sub_mc_skip mode in case that the prediction difference is zero (MVs==PMVs) and the prediction error signal 5 has no non-zero coefficients to be encoded, like in the case of the determination of mc_skip.

In the conventional encoding methods disclosed in, for example, nonpatent references 1 and 2, mc_mode0, i.e. the skip mode corresponding only to the largest motion prediction unit block (in nonpatent references 1 and 2, a reference block as shown in this Embodiment 1 has the same size as a motion prediction unit block as shown in this Embodiment 1, and the largest motion prediction unit block corresponds to a macro block) is provided typically, and, in the skip mode, it is designed not to encode any information about macro blocks at all. In contrast, this Embodiment 1 is characterized in that this skip mode is further defined also in the hierarchical layer of sub_mc_mode. In the conventional encoding methods disclosed in, for example, nonpatent references 1 and 2, because a video signal which is handled has a relatively low sampling rate which is of the order of up to the resolution of HDTV, a motion prediction unit block having a smaller than a macro block simply means that the movement becomes complicated, and it is therefore difficult to carry out the encoding with efficiency even if the skip mode is taken into consideration. On the other hand, when encoding a video signal having a high sampling rate, such as an ultra-high-definition video having a sampling rate exceeding that of HDTV, or a video signal having the 4:4:4 format, simply disposing a skip mode in consideration of only the size of each motion prediction unit block which consists of an $L_i \times M_i$ pixel block cannot utilize the requirements about skip effectively when choosing a basic block (or a motion vector allocation region which is determined by a combination of basic blocks) smaller than each motion prediction unit block, and therefore a motion vector having a zero value and zero coefficient values are encoded explicitly at all times and the encoding efficiency is bad. Therefore, the image encoding device in accordance with this Embodiment 1 is constructed in such a way as to, when not only each motion prediction unit block which consists of an $L_i \times M_i$ pixel block which is a unit for mc_mode allocation has a size larger than a constant size, but also each basic block which consists of an $l_i \times m_i$ pixel block which is a unit for sub_mc_mode allocation has a size larger than a constant size ($l_i > l_t$, $m_i > m_t$), be able to select and use a sub_mc_skip mode for each basic block. The thresholds $l_t$ and $m_t$ can be determined uniquely from the values of $M_i$ and $L_i$ (e.g. $l_t = L_i/2$ and $m_t = M_i/2$). As an alternative, the thresholds can be transmitted with them being multiplexed into the bit stream at a level such as a frame or a sequence.

Through the above-mentioned process by the predicting unit 4, the prediction error signal 5 and the parameters 17 (the motion prediction mode and the motion vector) for prediction signal creation are outputted, and these are entropy-encoded by the variable length encoding unit 8. Hereafter, an entropy coding method of entropy-encoding the parameters 17 for prediction signal creation which is a feature of the image encoding device in accordance with this Embodiment 1 will be described.

Figure 9:
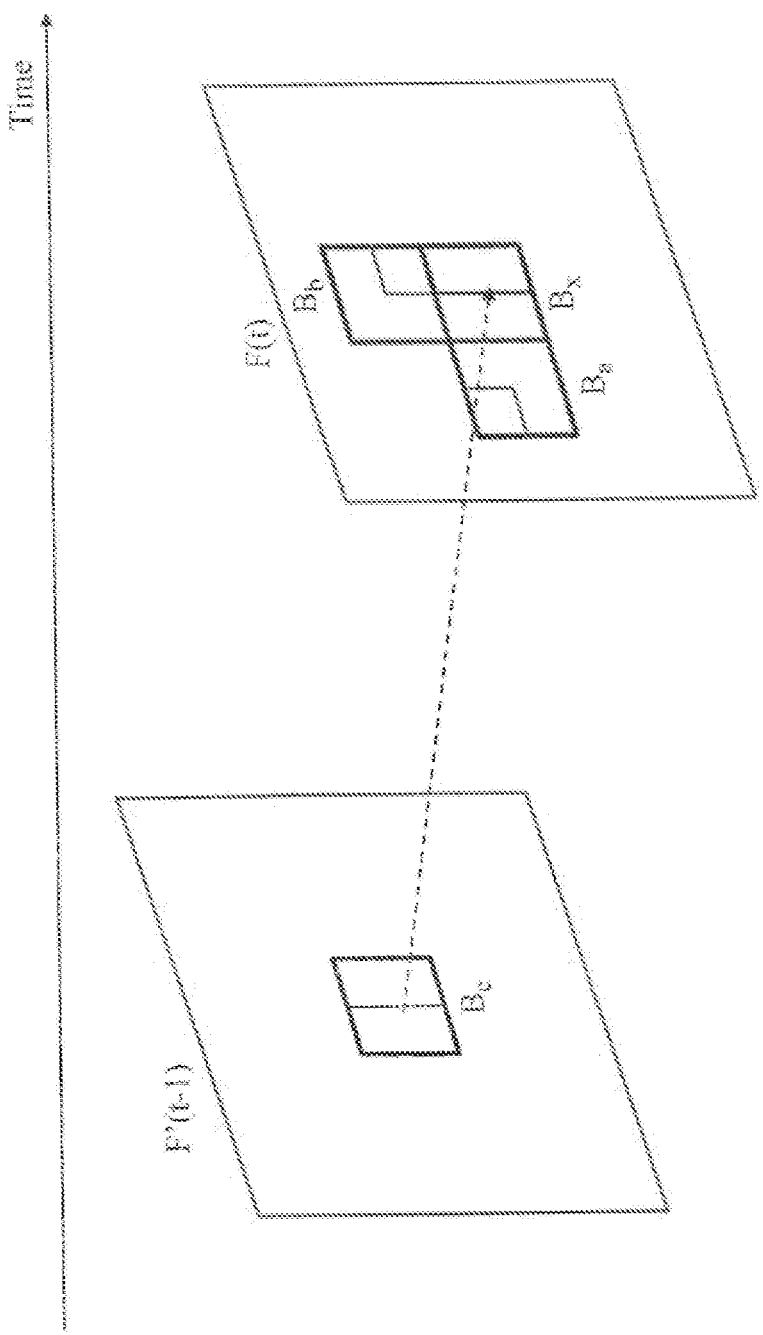
FIG. 9 is a view for explaining an entropy encoding method which a variable length encoding unit uses.

In the encoding of the parameter 17 for prediction signal creation which will be explained hereafter, the two types of parameters including the motion vector and the motion prediction mode are the target of explanation. FIG. 9 is a view for explaining the entropy coding method which the variable length encoding unit 8 uses. In the image encoding device in accordance with this Embodiment 1, as shown in FIG. 9, when encoding the motion prediction mode m(B$_x$) of a basic block B$_x$ which is a target for predictive encoding, the variable length encoding unit performs the entropy coding by selectively referring to the state of the prediction mode m($B_a$) of the basic block $B_a$ on the left of the target basic block in the same frame F(t), the state of the prediction mode m($B_b$) of the basic block $B_b$ just above the target basic block in the same frame F(t), and the state of the motion prediction mode m($B_c$) of the basic block $B_c$ at the same position as the basic block $B_x$ in the immediately preceding adjacent frame F'(t−1).

Figure 10:
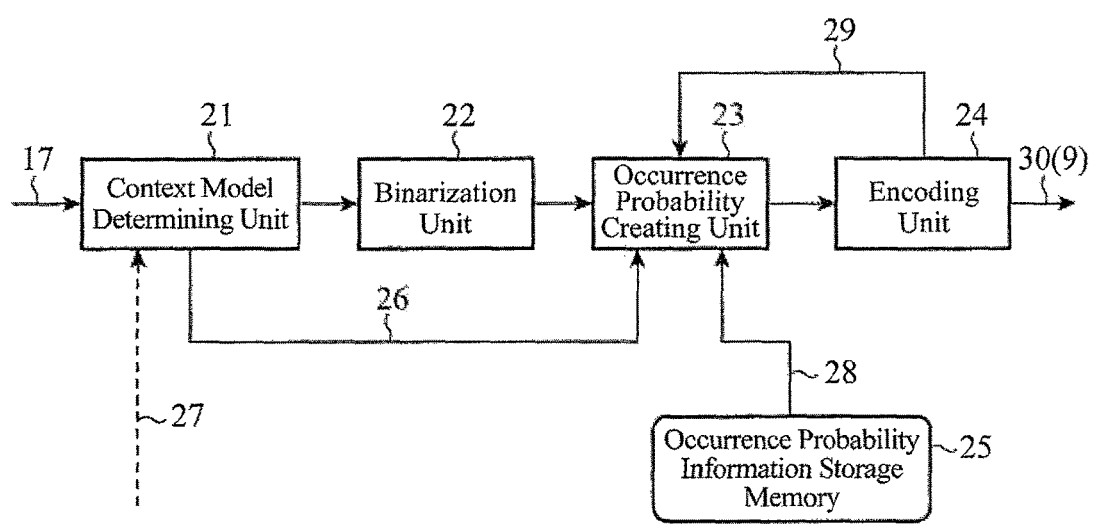
FIG. 10 is a block diagram showing the internal structure of the variable length encoding unit shown in FIG. 2.
Figure 11:
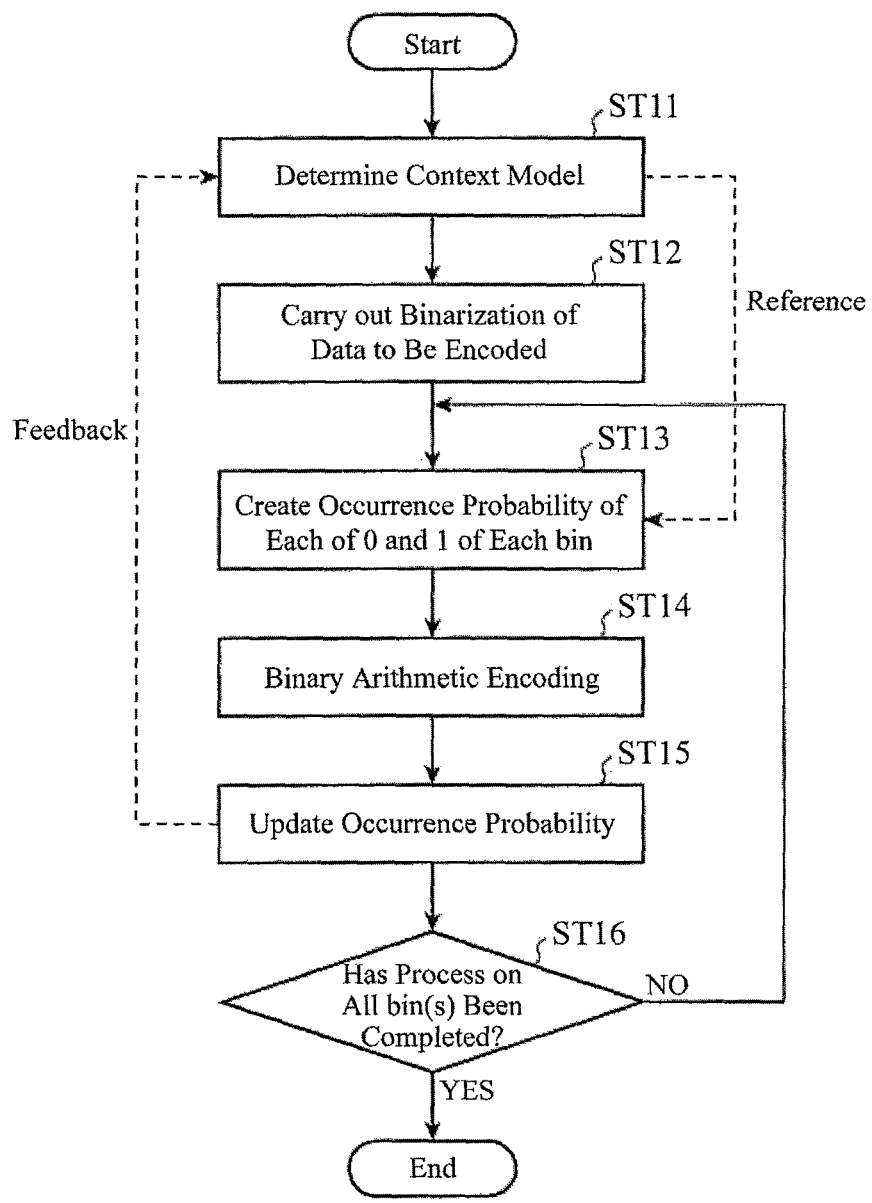
FIG. 11 is a flow chart showing the operation of the variable length encoding unit shown in FIG. 2.

FIG. 10 shows the internal structure of the variable length encoding unit 8, and FIG. 11 shows a flow of the operation of the variable length encoding unit. The variable length encoding unit 8 in accordance with this Embodiment 1 is comprised of a context model determining unit 21 for determining a context model (which will be mentioned later) defined for each of data types including the motion prediction mode and the motion vector which are data to be encoded, a binarization unit 22 for converting multi-valued data into binary data according to a binarization rule determined for each data type to be encoded, an occurrence probability creating unit 23 for providing the occurrence probability of each value (0/1) of each binarized bin, an encoding unit 24 for performing arithmetic encoding according to the created occurrence probability, and an occurrence probability information storage memory 25 for storing occurrence probability information. Hereinafter, an explanation will be made by limiting the input to the context model determining unit 21 to the motion prediction mode and the motion vector among the parameters 17 for prediction image creation.

(A) Context Model Determining Process (Step ST11 in FIG. 11)

Figure 12:
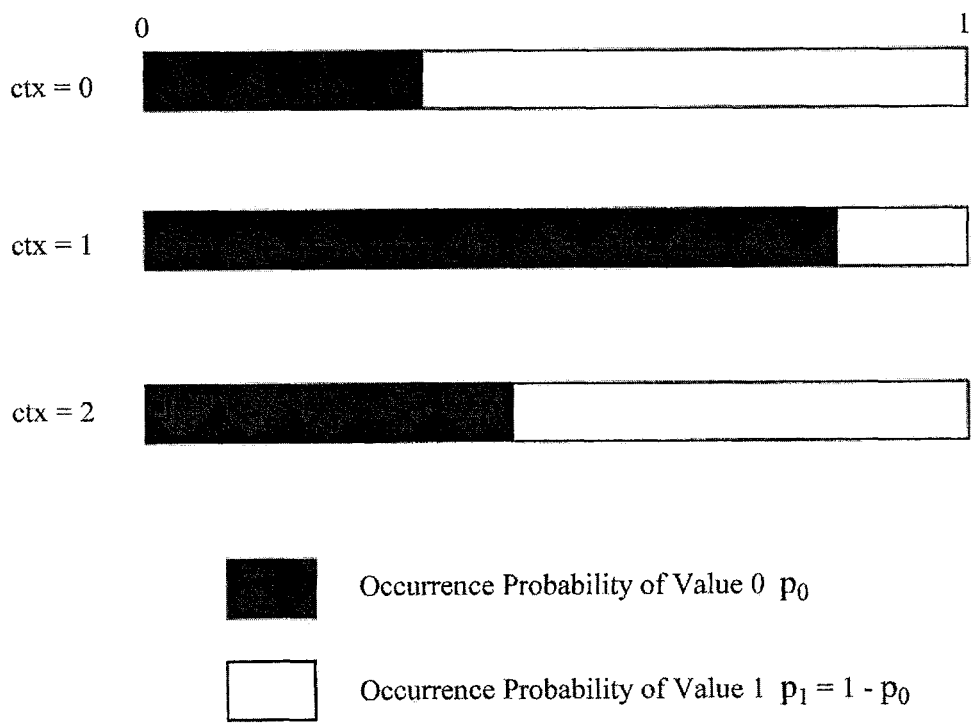
FIG. 12 is an explanatory drawing showing the concept behind a context model (ctx)

A context model models a dependency relation with other information resulting in a variation of the occurrence probability of an information source symbol, and it becomes able to perform encoding which is adapted according to the actual occurrence probability of a symbol by changing the state of the occurrence probability depending on this dependency relation. The concept behind the context model ctx is shown in FIG. 12. In this figure, although an information source symbol is binary, it can be alternatively multi-valued. However, in this Embodiment 1, only binary arithmetic encoding is handled.

Choices 0 to 2 of the context model ctx shown in FIG. 12 are defined on the assumption that the state of the occurrence probability of the information source symbol using this context model ctx would vary according to conditions. Applying this definition to the image encoding device in accordance with this Embodiment 1, the value of the context model ctx is changed according to the dependency relation between the encoded data in a certain reference block and the encoded data in another reference block adjacent to the reference block.

Figure 13:
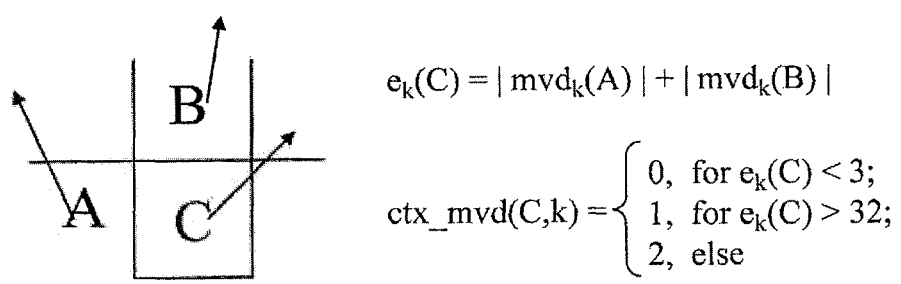
FIG. 13 is an explanatory drawing showing an example of a context model (ctx) related to a motion vector.

For example, FIG. 13 shows an example of a context model about a motion vector which is disclosed by "D. Marpe et. al., "Video Compression Using Context-Based Adaptive Arithmetic Coding", International Conference on Image Processing 2001". In the example of FIG. 13, a motion vector of a block C is a target to be encoded (precisely, a prediction difference value $mvd_k$(C) which is predicted for the motion vector of the block C from adjacent blocks is encoded). Furthermore, ctx_mvd(C, k) shows a context model applied to the motion vector of the block C. $mvd_k$(A) shows a motion vector prediction difference in a block A, and $mvd_k$(B) shows a motion vector prediction difference in a block B. These values are used for the definition of an evaluated value $e_k$(C) for changing the context model. The evaluated value $e_k$(C) shows variations in the adjacent motion vectors. Generally, when these variations are small, the motion vector prediction difference value $mvd_k$(C) is small, whereas when the evaluated value $e_k$(C) is large, the motion vector prediction difference value(C) has a tendency to be large. It is therefore desirable that the symbol occurrence probability of the motion vector prediction difference $mvd_k$(C) is adapted according to the evaluated value $e_k$(C). A set of variations of this occurrence probability is context models, and, in this case, it can be said that there are three types of occurrence probability variations.

Thus, context models are defined for each data to be encoded in advance, and are shared between the image encoding device and the image decoding device. The context model determining unit 21 carries out a process of selecting one of models predetermined according to the type of such data to be encoded. Which occurrence probability variation in the context model is selected corresponds to an occurrence probability creating process (C) which will be shown below.

In FIG. 10, the variable length encoding unit 8 is characterized in that it prepares two or more candidates for a context model 26 which is to be allocated to the motion prediction mode and the motion vector, and then switches between the two or more candidates for the context model 26 which the variable length encoding unit uses according to the context model selection information 27. As shown in FIG. 9, because it can be considered that the motion prediction mode m($B_x$) of the basic block $B_x$ which is the target for prediction and encoding has a high correlation with the state of an image region which is adjacent spatially within the same frame if the correlation about the state of movement between frames is low (more specifically, the value of the motion prediction mode m($B_x$) is strongly influenced by the divided shapes in the motion prediction modes m($B_a$) and m($B_b$)), both the motion prediction mode m($B_a$) of the basic block $B_b$ on the left of the target basic block within the same frame and the motion prediction mode m($B_b$) of the basic block $B_a$ just above the target basic block within the same frame are used for the determination of the context model 26. An example which constitutes grounds for this concept is shown in FIG. 14. FIG. 14 shows a comparison between two states of the motion prediction modes selected for the basic blocks $B_a$ and $B_b$ in the case of the motion prediction mode m($B_x$)=mc_mode3. In the state shown in FIG. 14(a), the breaks of division of each of the basic blocks $B_a$ and $B_b$ are connected naturally to the divided shapes in the motion prediction mode m($B_x$), respectively. In contrast, in the state shown in FIG. 14(b), the breaks of division of each of the basic blocks $B_a$ and $B_b$ are not connected naturally to the divided shapes. In general, because these divided shapes in each reference block show the existence of a plurality of different movement regions existing in the reference block, they easily reflect the structure of the video. Therefore, it can be considered that the state shown in FIG. 14(a) is a "state which happens easily" rather than the state shown in FIG. 14(b). More specifically, the occurrence probability of the motion prediction mode m($B_x$) is affected by the states of the motion prediction modes m($B_a$) and m($B_b$).

Similarly, because it can be considered that the motion prediction mode m($B_x$) of the basic block $B_x$ has a high correlation with the state of an image region which is adjacent with respect to time if the correlation about the state of movement between frames is high (more specifically, the probability which the motion prediction mode m($B_x$) can have varies depending on the divided shapes in the motion prediction mode m($B_c$)), the variable length encoding unit 8 uses both the motion prediction mode m($B_c$) of the basic block $B_c$ at the same position as the basic block $B_x$ in the immediately preceding adjacent frame for the determination of the context model 26.

Similarly, when determining the context model 26 for the motion vector, if the correlation about the state of movement between frames is low, the variable length encoding unit 8 uses both the motion vector of the block $B_a$ on the left of the target basic block within the same frame, and the motion vector of the block $B_b$ just above the target basic block for the determination of the context model 26. In contrast, if the correlation about the state of movement between frames is high, the variable length encoding unit 8 uses the motion vector of the block $B_c$ at the same position as the block $B_x$ in the immediately preceding adjacent frame for the determination of the context model 26. Like in the case of determining the context model for the motion prediction mode, the variable length encoding unit can use a correlation between the color components also for the determination of the context model 26 for the motion vector.

The image encoding device can detect whether the correlation about the state of movement between frames is high or low by using a predetermined method, and can explicitly multiplex the value of the context model selection information 27 with the bit stream 9 to transmit this value of the context model selection information to the image decoding device. Both the image encoding device and the image decoding device can be constructed in such a way as to determine the value of the context model selection information 27 according to detectable information. Because the video signal is unsteady, the efficiency of arithmetic encoding can be improved by making it possible to carry out such the adaptive control.

(B) Binarization Process (Step ST12 Shown in FIG. 11)

The binarization unit 22 forms each data to be encoded into a binary sequence and determines a context model according to each bin (binary position) of the binary sequence. The rule of binarization follows a rough distribution of values which each encoded data can have, and the binarization unit performs conversion of each data to be encoded into a variable-length binary sequence. Because in the binarization, data to be encoded which can be originally multi-valued is encoded per bin rather than being arithmetic-encoded just as it is, the binarization has the merit of being able to reduce the number of divisions of a probability number line and hence simplify the arithmetic operation, and to slim the context model, for example.

For example, when carrying out the encoding with $L_i=M_i=32$ and $l_i=m_i=16$, the binarization unit 22 performs the binarization of the motion prediction mode, as shown in FIGS. 15($a$) and 15($b$).

Figure 16A:
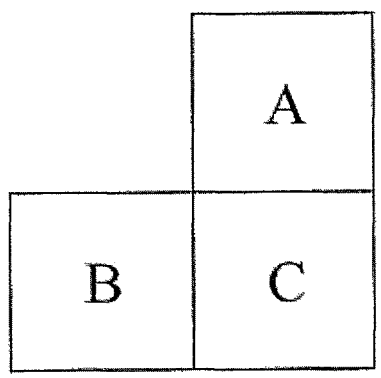
FIG. 16A is a view explaining the binarization of the motion prediction mode carried out by the binarization unit shown in FIG. 10, and shows a method of selecting a context model for bin0.
Figure 16B:
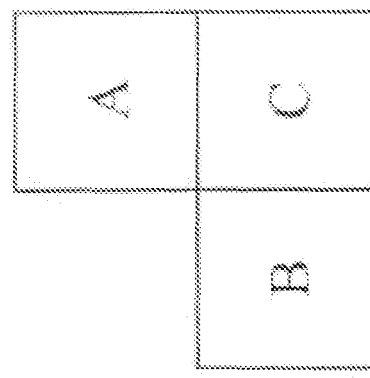
FIG. 16B is a view explaining the binarization of the motion prediction mode carried out by the binarization unit shown in FIG. 10, and shows a method of selecting a context model for bin1.
Figure 16C:
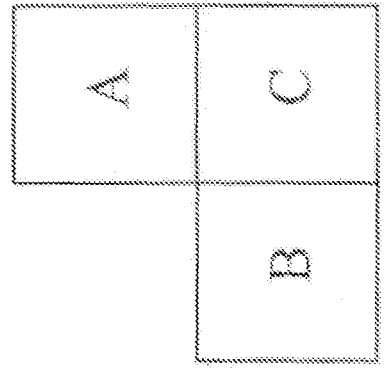
FIG. 16C is a view explaining the binarization of the motion prediction mode carried out by the binarization unit shown in FIG. 10, and shows a method of selecting a context model for bin2.
Figure 16D:
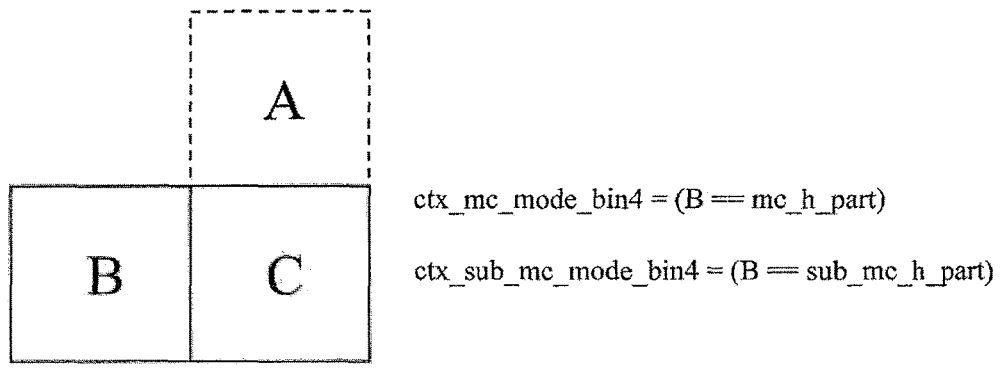
FIG. 16D is a view explaining the binarization of the motion prediction mode carried out by the binarization unit shown in FIG. 10, and shows a method of selecting a context model for bin4.
Figure 16E:
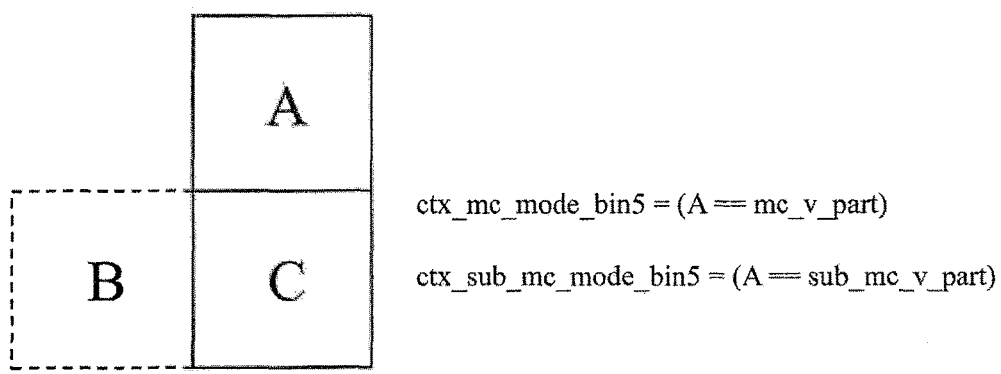
FIG. 16E is a view explaining the binarization of the motion prediction mode carried out by the binarization unit shown in FIG. 10, and shows a method of selecting a context model for bin5.

Context models as shown in FIGS. 16A to 16E are applied to Bin0, Bin1, Bin2, Bin4, and Bin5, respectively. As shown in FIG. 16A, Bin0 has a criterion by which to switch among the occurrence probabilities according to whether or not the states of the motion prediction unit block at the upper position (block A) and the motion prediction unit block at the left position (block B) with respect to the data to be encoded (block C) are "skip mode". As shown in FIG. 16B, Bin1 has a criterion by which to switch among the occurrence probabilities according to whether or not the states of the motion prediction unit block at the upper position (block A) and the motion prediction unit block at the left position (block B) are "whether or not there is a motion prediction block division". As shown in FIG. 16C, Bin2 has a criterion by which to switch among the occurrence probabilities according to whether or not the states of the motion prediction unit block at the upper position (block A) and the motion prediction unit block at the left position (block B) are "where or not the state is a complicated motion prediction mode". For Bin3, no context model is defined and the occurrence probability is fixed to a predetermined occurrence probability. As shown in FIG. 16D, Bin4 has a criterion by which to switch among the occurrence probabilities according to whether or not the state of the motion prediction unit block at the left position (block B) is "whether or not the motion prediction shape division is a horizontal division". As shown in FIG. 16E, Bin5 has a criterion by which to switch among the occurrence probabilities according to whether or not the state of the motion prediction unit block at the upper position (block A) is "whether or not the motion prediction shape division is a vertical division". By determining the context model 26 according to the shape of the motion prediction region in this way, the selection of the occurrence probability related to the motion prediction mode information can be made adaptively depending on the properties of the local video signal, and the encoding efficiency of the arithmetic encoding can be improved. The image encoding device is constructed in such a way as to, when making a decision not to use sub_mc_skip at $l_i=m_i=16$ (the threshold $l_i>=16$ and the threshold $m_i>=16$), not encode Bin0 shown in FIG. 15($b$).

(C) Occurrence Probability Creating Process (Step ST13 Shown in FIG. 11)

In the processes (steps ST11 and ST12) of above-mentioned (A) and (B), the binarization of each multi-valued data to be encoded and the setup of the context model which is applied to each bin are completed, and the preparation for the encoding is completed. The occurrence probability creating unit 23 then carries out a creating process of creating the occurrence probability information used for the arithmetic encoding. Because variations of the occurrence probability corresponding to each of the values 0 and 1 is included in each context model, the occurrence probability creating unit carries out the process with reference to the context model 26 determined in step ST11. The occurrence probability creating unit 23 determines an evaluated value for the selection of an occurrence probability, such as an evaluated value $e_k(C)$ shown in FIG. 13, and determines which occurrence probability variation the occurrence probability creating unit will use for the current encoding according to this evaluated value from among the choices of the context model to which the occurrence probability creating unit refers.

In addition, the variable length encoding unit 8 in accordance with this Embodiment 1 is provided with an occurrence probability information storage memory 25, and has a mechanism for storing the occurrence probability information 28 which is updated in turn through the encoding process, the pieces of occurrence probability information stored as the result of the update corresponding to the variations of the context model used. The occurrence probability creating unit 23 determines the occurrence probability information 28 which is used for the current encoding according to the value of the context model 26.

(D) Encoding Process (Step ST14 Shown in FIG. 11)

In the above-mentioned process (C) (step ST13), because the occurrence probability of each of the values 0 and 1 on the probability number line required for the arithmetic encoding process is acquired, the encoding unit 24 performs arithmetic encoding according to the process mentioned as a conventional example (step ST14).

Furthermore, the actual encoded value (0/1) 29 is fed back (feedback) to the occurrence probability creating unit 23, the occurrence probability creating unit counts the frequency of occurrence of each of the values 0 and 1 in order to update the used occurrence probability information 28 (step ST15). For example, it is assumed that when the encoding process of encoding 100 bin(s) is carried out using a certain piece of occurrence probability information 28, the occurrence probabilities of 0 and 1 in the occurrence probability variation are 0.25 and 0.75, respectively. In this case, when "1" is encoded using the same occurrence probability variation, the frequency of occurrence of "1" is updated, and the occurrence probabilities of 0 and 1 vary to 0.247 and 0.752, respectively. Using this mechanism, the encoding unit becomes able to perform efficient encoding which is adapted for the actual occurrence probability.

After the encoding process on all the bin(s) is completed (Yes), an arithmetic encoding result 30 which the encoding unit 24 has created becomes an output from the variable length encoding unit 8, and is outputted from the image encoding device as the bit stream 9 (step ST16), otherwise if not completed (No) it returns to ST13.

2. Structure of the Encoded Bit Stream

Figure 17:
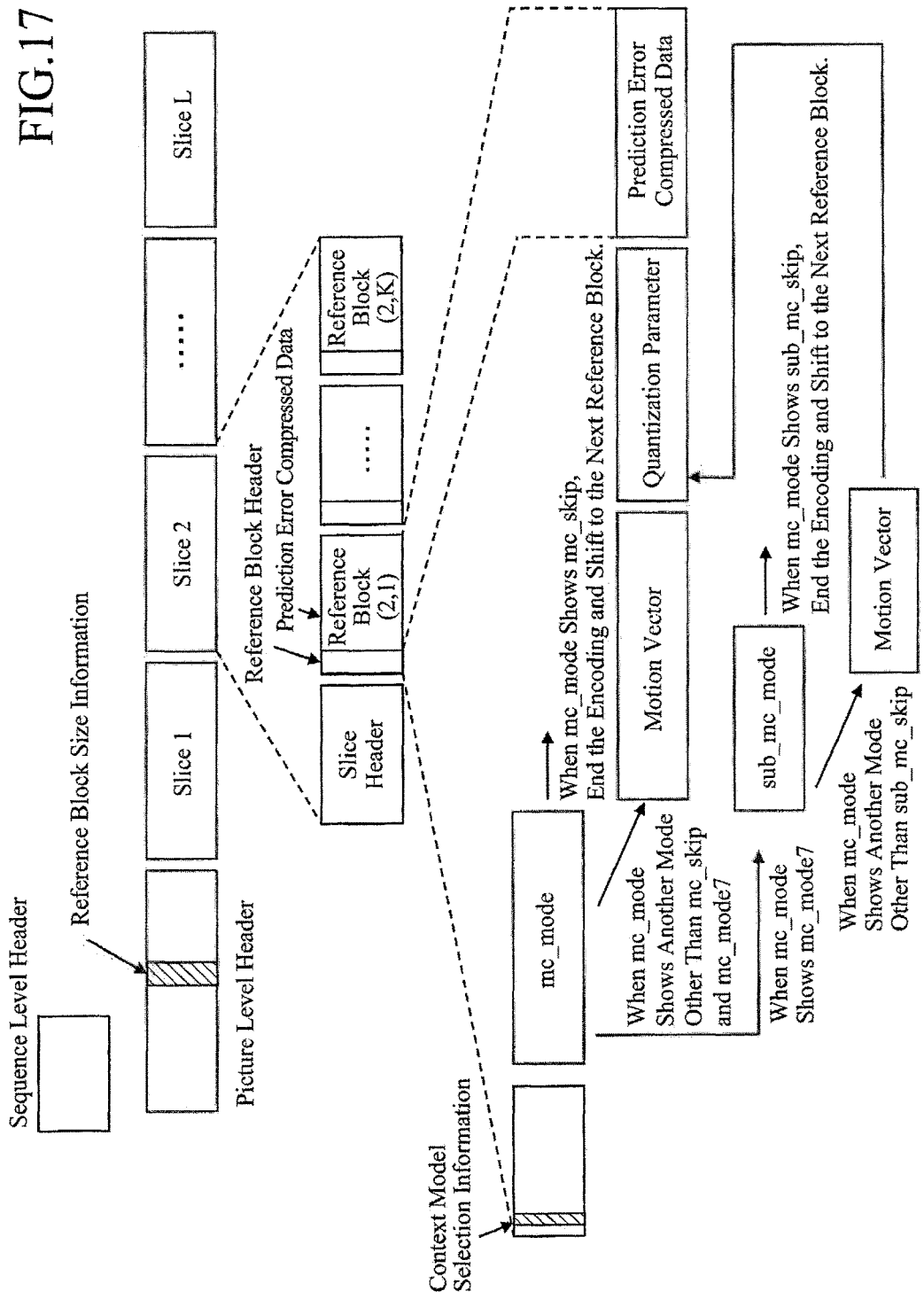
FIG. 17 is an explanatory drawing showing the data arrangement of a bit stream.

The inputted video signal 1 is encoded by the image encoding device of FIG. 2 according to the above-mentioned processes, and the encoded video signal is outputted from the image encoding device as the bit stream 9 in units each of which is a bundle consisting of a plurality of reference blocks (each unit is referred to as a slice from here on). The data arrangement of the bit stream 9 is shown in FIG. 17. The bit stream 9 is constructed as the one in which a number of encoded data whose number is equal to the number of reference blocks included in each frame are collected in each frame, and the reference blocks are unitized in each slice. A picture level header to which the reference blocks belonging to the same frame refer as a common parameter is prepared, and the reference block size information 18 is stored in this picture level header. If the reference block size $M_{max}$ is fixed per sequence at a higher level than the picture level, the reference block size information 18 can be formed to be multiplexed into the sequence level header.

Each slice begins from its slice header, and the encoded data of each reference block in the slice are arranged continuously after the slice header. The example of FIG. 17 shows that the K reference blocks are included in the second slice. Each reference block data is comprised of a reference block header and prediction error compressed data. In the reference block header, the motion prediction modes mc_mode and the motion vectors of the motion prediction unit blocks in the corresponding reference block (they correspond to the parameters 17 for prediction signal creation), the quantization parameters 19 used for creation of the prediction error compressed data 7, etc. are arranged.

Mode type information, as the motion prediction mode mc_mode, indicating mc_skip or one of mc_mode0 to mc_mode7 is encoded first, and, when the motion prediction mode mc_mode is mc_skip, any subsequent pieces of macro block encoding information are not transmitted. When the motion prediction mode mc_mode is one of mc_mode0 to mc_mode6, the pieces of motion vector information of the motion vector allocation regions specified by the motion prediction mode are encoded. When the motion prediction mode mc_mode is mc_mode7, whether or not sub_mc_skip is included in the code of sub_mc_mode is determined according to the reference block size information 18. Hereinafter, it is assumed that the thresholds used for determining whether or not sub_mc_skip are included in the code of sub_mc_mode are defined as $l_t = L_i/2$ and $m_t = M_i/2$ from the reference block sizes $M_i$ and $L_i$. Moreover, when the requirements of "$l_i > l_t$ and $m_i > m_t$" are satisfied, the encoding of sub_mc_mode including sub_mc_skip is performed according to the binarization rule shown in FIG. 15(*b*). In contrast, when the requirements of "$l_i > l_t$ and $m_i > m_t$" are not satisfied, only the encoding of Bin0 is excluded from the binarization rule shown in FIG. 15(*b*). Furthermore, the context model selection information 27 showing a guide for selecting a context model in the arithmetic encoding of the motion prediction mode and the motion vector is included in the reference block header.

Although not illustrated, the reference block size determining unit can be constructed in such a way as to select the sizes $L_i$ and $M_i$ of each motion prediction unit block which are used within each reference block for each reference block, and multiplex the sizes $L_i$ and $M_i$ of the motion prediction unit block which are used within each reference block into each reference block header, instead of multiplexing the sizes $L_i$ and $M_i$ into the sequence or the picture level header. As a result, although the image encoding device needs to encode the sizes $L_i$ and $M_i$ of each motion prediction unit block for each reference block, the image encoding device can change the sizes of each motion prediction unit block according to the properties of the local image signal, and becomes able to perform the motion prediction with a higher degree of adaptability. Information indicating whether to either multiplex the sizes $L_i$ and $M_i$ of each motion prediction unit block into either each reference block header or fixedly multiplex them into a header at an upper level, such as a sequence, a GOP, a picture, or a slice can be multiplexed, as identification information, into the header at an upper level, such as a sequence, a GOP, a picture, or a slice. As a result, when the influence exerted upon the motion prediction ability is small even if the sizes of each motion prediction unit block are fixedly multiplexed into an upper level header, the image encoding device can reduce the overhead required for encoding the sizes $L_i$ and $M_i$ of each motion prediction unit block for each reference block, and hence perform the encoding with efficiency.

3. Image Decoding Device

Figure 18:
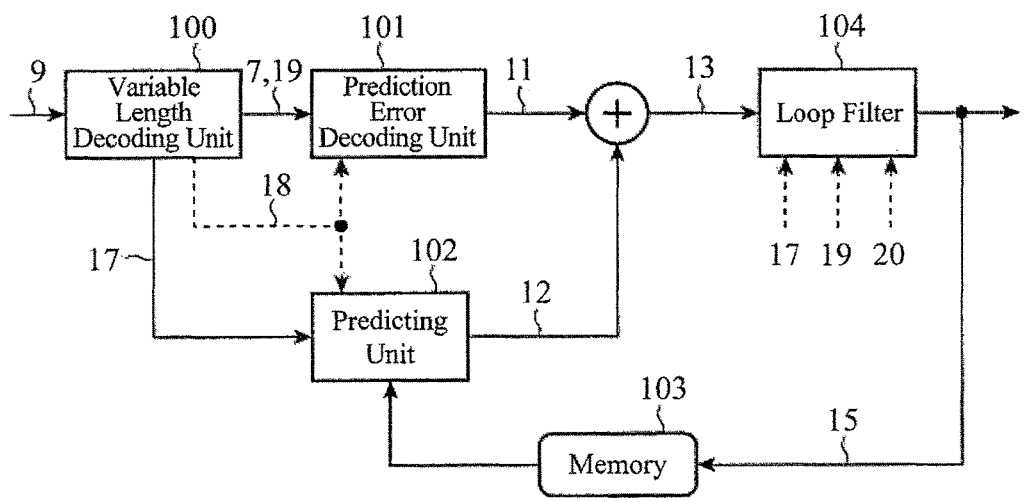
FIG. 18 is a block diagram showing the structure of an image decoding device in accordance with Embodiment 1.

FIG. 18 is a block diagram showing the structure of the image decoding device in accordance with this Embodiment 1. After receiving the bit stream 9 shown in FIG. 17 and then decoding the sequence level header, a variable length decoding unit (decoding unit) 100 decodes the picture level header and also decodes the information showing the reference block size. As a result, the variable length decoding unit recognizes the size $M_{max}$ of each reference block and the sizes $L_i$ and $M_i$ of each motion prediction unit block which are used for the picture, and notifies this reference block size information 18 to a prediction error decoding unit 101 and a predicting unit 102. The variable length decoding unit 100 is constructed in such a way as to, when the bit stream has a structure in which the sizes $L_i$ and $M_i$ of each motion prediction unit block can be multiplexed into each reference block header, decode the identification information showing whether or not the sizes $L_i$ and $M_i$ of each motion prediction unit block are multiplexed into each reference block header, and recognize the sizes $L_i$ and $M_i$ of each motion prediction unit block by decoding each reference block header according to the identification information.

The variable length decoding unit starts decoding each reference block data from decoding of the reference block header first. In this process, the variable length decoding unit 100 decodes the context model selection information 27. Next, according to the decoded context model selection information 27, the variable length decoding unit decodes the motion prediction mode which is applied to each motion prediction unit block for each color component. When decoding the motion prediction mode, the variable length decoding unit decodes mc_mode for each motion prediction unit block first, and, when mc_mode shows mc_skip, determines an estimated vector from adjacent motion vectors according to the requirements shown in FIG. 8 and allocates the estimated vector to the current motion vector. When mc_mode shows mc_mode7, the variable length decoding unit decodes sub_mc_mode for each basic block according to the requirements shown in FIG. 8. At this time, on the basis of the reference block size information 18, the variable length decoding unit determines whether or not to use sub_mc_skip according to the same determination criterion as that which the image encoding device uses, and then performs a process of decoding sub_mc_mode according to this determination. When using sub_mc_skip, if sub_mc_mode=sub_mc_skip, the variable length decoding unit skips the decoding of the encoded data of the basic block in question, and allocates an estimated vector which the variable length decoding unit determines by using the method shown in FIG. 8 to the current motion vector. When mc_mode shows another mode, the variable length decoding unit decodes the motion vector in each of the number of motion vector allocation regions according to the context model selection information 27, and further decodes the pieces of information about the quantization parameters 19, the prediction error compressed data 7, etc. in turn for each reference block.

The prediction error compressed data 7 and the quantization parameters 19 are inputted to the prediction error decoding unit 101, and are decompressed to a decoded prediction error signal 11. This prediction error decoding unit 101 carries out a process equivalent to that carried out by the local decoding unit 10 in the image encoding device shown in FIG. 2.

The predicting unit 102 creates a prediction signal 12 from both the parameters 17 for prediction signal creation decoded by the variable length decoding unit 100, and a reference image signal 15 stored in a memory 103. Although the predicting unit 102 carries out a process equivalent to that carried out by the predicting unit 4 in the image encoding device, this process does not include any motion vector detecting operation. The motion prediction mode is either of mc_mode0 to mc_mode7 shown in FIG. 4, and the predicting unit 102 creates a prediction image 12 by using the motion vector allocated to each basic block according to the divided shapes.

The decoded prediction error signal 11 and the prediction signal 12 are added by an adder unit, and are inputted to a loop filter 104 as a decoded signal 13. This decoded signal 13 is stored in the memory 103 as the reference image signal 15 for creating a subsequent prediction signal 12 after the decoded signal is subjected to a process of removing encoding noise in the loop filter 104. Although not illustrated to FIG. 18, the loop filter 104 carries out a process equivalent to that carried out by the loop filter 14 in the image encoding device by using filter coefficient information 20 in addition to the parameters 17 for prediction signal creation and the quantization parameters 19 which are acquired through the decoding by the variable length decoding unit 100, to create the reference image signal 15. A difference between the loop filter 14 of the image encoding device and the loop filter 104 of the image decoding device is in that while the former creates the filter coefficient information 20 with reference to the encoded signal 3 which is the original image signal, the latter carries out the filtering process with reference to the filter coefficient information 20 acquired by decoding the bit stream 9.

Hereafter, the process of decoding the motion prediction mode and the motion vector of each reference block which is carried out by the variable length decoding unit 100 will be described.

Figure 19:
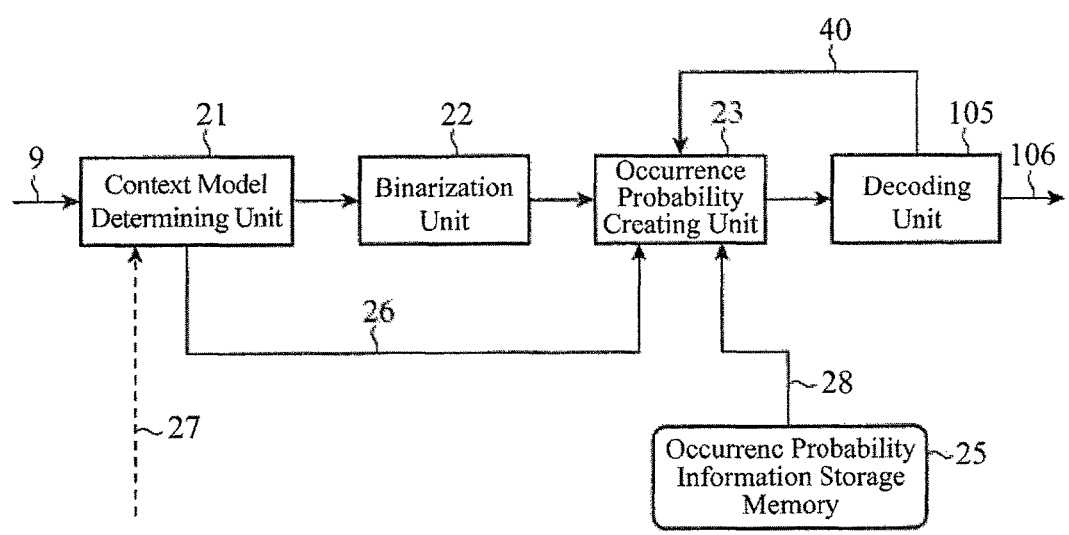
FIG. 19 is a block diagram showing the internal structure of a variable length decoding unit shown in FIG. 18.
Figure 20:
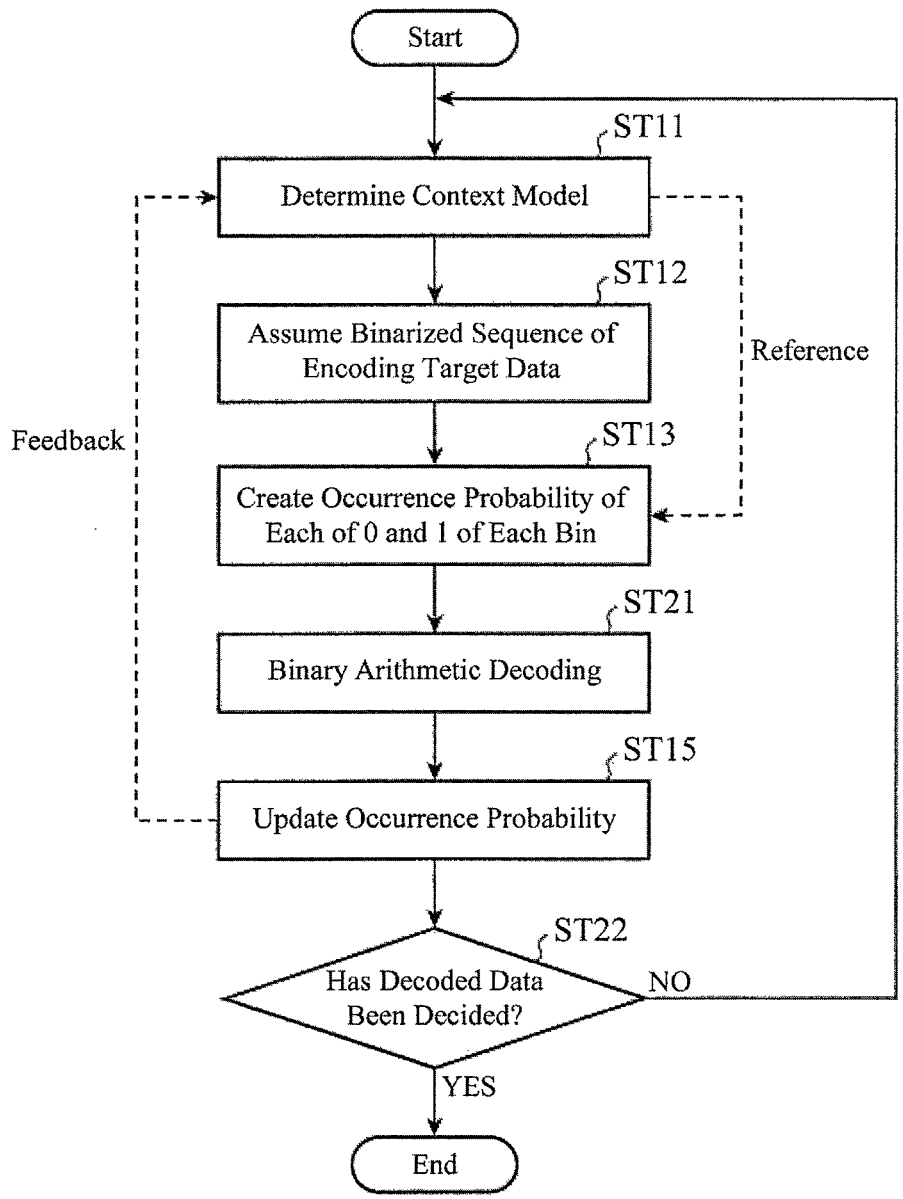
FIG. 20 is a flow chart showing the operation of the variable length decoding unit shown in FIG. 18.
Figure 21:
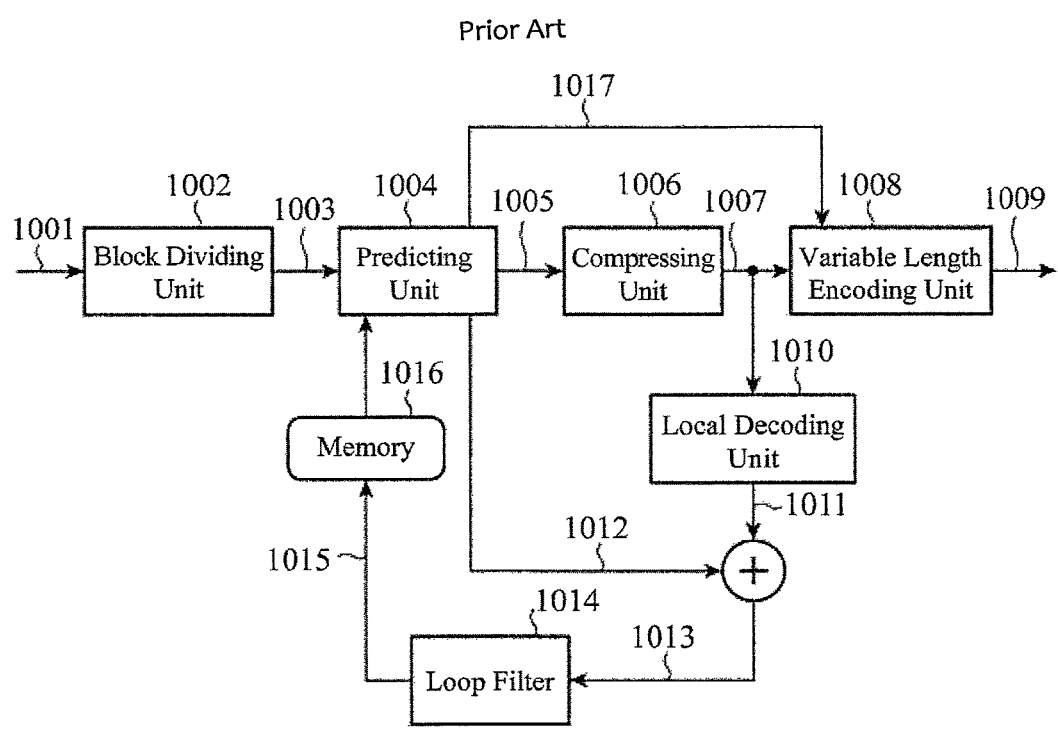
FIG. 21 is a block diagram showing the structure of an encoding device disclosed by nonpatent reference 1.
Figure 22:
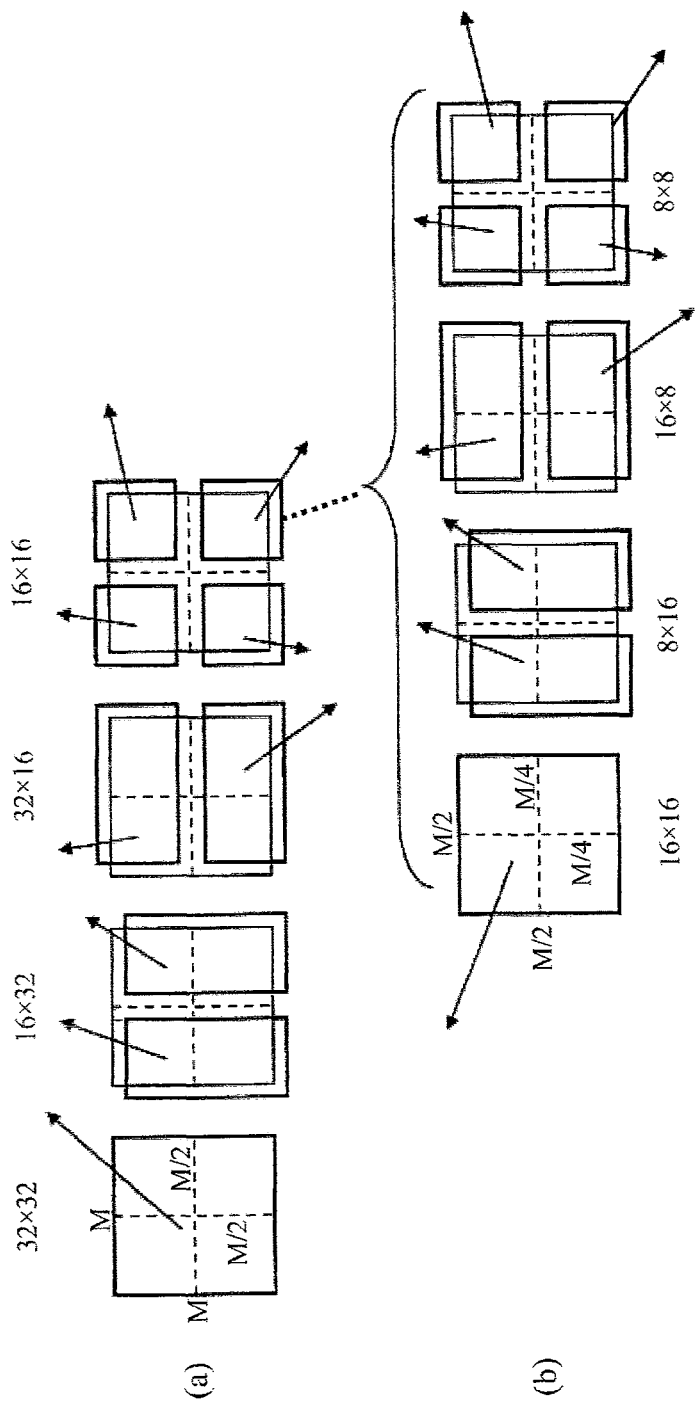
FIG. 22 is a view showing the appearance of divided shapes of a motion vector allocation region at the time of performing a motion-compensated prediction for each macro block in the encoding device disclosed by nonpatent reference 1.

FIG. 19 shows an internal structure associated with the arithmetic decoding process carried out by the variable length decoding unit 100, and FIG. 20 shows an operation flow of the arithmetic decoding process.

The variable length decoding unit 100 in accordance with this Embodiment 1 is comprised of a context model determining unit 21 for determining the type of each of the data to be decoded including the parameters 17 for prediction signal creation including the motion prediction mode, the motion vector, etc., the prediction error compressed data 7, and the quantization parameters 19 to determine a context model which is defined in common with the image encoding device for each target to be decoded data, a binarization unit 22 for creating a binarization rule which is defined according to the type of each data to be decoded, an occurrence probability creating unit 23 for providing the occurrence probability of each bin (0 or 1) according to the binarization rule and the context model, a decoding unit 105 for carrying out arithmetic decoding according to the created occurrence probability, and decoding the encoded data on the basis of a binary sequence acquired as a result of the arithmetic decoding and the above-mentioned binarization rule, and an occurrence probability information storage memory 25 for storing occurrence probability information 28. Each unit which is designated by the same reference numeral as that denoting an internal component of the variable length encoding unit 8 shown in FIG. 10, among the units shown in FIG. 19, performs the same operation as that performed by the internal component.

(E) Context Model Determining Process, Binarization Process, and Occurrence Probability Creating Process (Steps ST11 to ST13 Shown in FIG. 20)

Because these processes (steps ST11 to ST13) are similar to the processes (A) to (C) (steps ST11 to ST13 shown in FIG. 11) carried out by the image encoding device, the explanation of the steps will be omitted hereafter. For the determination of a context model which is used for decoding the motion prediction mode and the motion vector, the above-mentioned decoded context model selection information 27 is referred to.

(F) Arithmetic Decoding Process (Steps ST21, ST15, and ST22 Shown in FIG. 20)

Because the occurrence probability of bin which the decoding unit 105 is going to decode from now on is decided in the above-mentioned process (E), the decoding unit 105 reconstructs the value of bin according to the predetermined arithmetic decoding process (step ST21). The reconstructed value 40 (FIG. 19) of bin is fed back (feedback) to the occurrence probability creating unit 23, and the frequency of occurrence of each of 0 and 1 is counted for an update of the used occurrence probability information 28 (step ST15). Every time when the reconstructed value of each bin is decided, the decoding unit 105 checks whether the reconstructed value matches a binary sequence pattern determined according to the binarization rule, and outputs the data value indicated by the pattern which the reconstructed value matches as a decoded data value 106 (step ST22). Unless any decoded data is decided (Yes), the decoding unit returns to step ST11 and continues the decoding process (No).

Although the context model selection information 27 is multiplexed in units of a reference block unit in the above-mentioned explanation, the context model selection information can be alternatively multiplexed in units of a slice, a picture, or the like. In a case in which the context model selection information is multiplexed as a flag positioned in a higher data layer, such as a slice, a picture, or a sequence, and an adequate degree of encoding efficiency can be ensured by switching among upper layers higher than a slice, overhead bits can be reduced without multiplexing the context model selection information 27 one by one at the reference block level.

Furthermore, the context model selection information 27 can be information which is determined within the image decoding device according to related information different from the context model selection information and included in the bit stream. In addition, although in the above-mentioned explanation, it is explained that the variable length encoding unit 8 and the variable length decoding unit 100 carry out the arithmetic encoding process and the arithmetic decoding process, these processes can be a Huffman encoding process and a Huffman decoding process and the context model selection information 27 can be used as a means for changing a variable length encoding table adaptively.

The image encoding and decoding devices which are constructed as above can express a hierarchy of skip modes and can encode information including a motion prediction mode and a motion vector adaptively according to the internal state of each reference block to be encoded, and can therefore carry out the encoding with efficiency.

As mentioned above, the image encoding device in accordance with Embodiment 1 is constructed in such a way as to include the predicting unit 4 for adaptively determining the size of each motion prediction unit block according to color component signals, and for dividing each motion prediction unit block into motion vector allocation regions to search for a motion vector; and the variable length encoding unit 8 for, when a motion vector is allocated to the whole of each motion prediction unit block, performing encoding to create a bit stream 9 by setting the motion prediction mode to mc_skip mode if the motion vector is equal to an estimated vector which is determined from motion vectors in surrounding motion prediction unit blocks and data to be encoded as a prediction error signal 5 does not exist, and for, when each of the motion vector allocation regions has a size equal to or larger than a predetermined size and a motion vector is allocated to the whole of each of the motion vector allocation regions, performing encoding to create a bit stream 9 by setting the motion prediction mode to sub_mc_skip mode if the motion vector is equal to an estimated vector which is determined from motion vectors in surrounding motion vector allocation regions and data to be encoded as a prediction error signal 5 does not exist. Therefore, in order to encode a color video signal having the 4:4:4 format with efficiency, the image encoding device can express a hierarchy of skip modes and can encode the information including the motion prediction mode and the motion vector adaptively according to the internal state of each reference block to be encoded. As a result, when carrying out encoding at a low bit rate providing a high compression ratio, the image encoding device can carry out the encoding while reducing the code amount of the motion vector effectively.

Furthermore, the image decoding device in accordance with Embodiment 1 is constructed in such a way as to include the variable length decoding unit 100 for decoding a bit stream 9 inputted thereto to acquire parameters 17 for prediction signal creation showing the size of each motion prediction unit block, a motion prediction mode for specifying the shape of each of motion vector allocation regions into which each motion prediction unit block is divided, and a motion vector corresponding to each motion vector allocation region, and for determining whether or not each motion prediction unit block is in mc_skip mode and whether or not one of the motion vector allocation regions is in sub_mc_skip mode from the above-mentioned motion prediction mode, and the predicting unit 102 for, when a motion prediction unit block is in mc_skip mode or one of the motion vector allocation regions is in sub_mc_skip mode, determining an estimated vector from surrounding motion vectors, and setting this estimated vector as a motion vector and also setting all decoded prediction error signals 11 to zero to create a prediction signal 12, and for, when the motion prediction unit block is not in mc_skip mode and the motion vector allocation regions of the motion prediction unit block are not in sub_mc_skip mode, creating a prediction signal 12 on the basis of the motion prediction mode and the motion vector which the variable length decoding unit 100 acquires by decoding the bit stream. Accordingly, the video decoding device can be constructed in such a way as to correspond to the above-mentioned image encoding device.

Although in this Embodiment 1 the example in which a 4:4:4 video signal is encoded and decoded is explained, it is needless to say that the encoding and decoding processes in accordance with the present invention can be applied to a case in which encoding and decoding are carried out in units of a reference block, such as a macro block, in video encoding aimed at encoding a video having a 4:2:0 or 4:2:2 format in which a color thinning operation is performed in a conventional brightness color difference component format, as previously mentioned.

INDUSTRIAL APPLICABILITY

Because the image encoding device, the image decoding device, the image encoding method, and the image decoding method in accordance with the present invention make it possible to perform an optimal encoding process on a video signal having the 4:4:4 format, they are suitable for use in an image compression coding technique, a compressed image data transmission technique, etc.

The invention claimed is:

1. An image decoding device which decodes a predictive-encoded bit stream to acquire a moving image signal, the bit stream being generated by dividing a frame of the moving image signal into reference blocks and by performing a motion prediction for the reference block, the image decoding device comprising:
    an arithmetic decoder to change an occurrence probability depending on dividing an adjacent block of the reference block for decoding the bit stream;
    a decoder to decode the bit stream to acquire information indicating a size of the reference block, information indicating a threshold on a block size which corresponds to a minimum size of a motion prediction unit block, a motion vector, and a motion prediction mode,
    wherein the decoder
    acquires a first motion prediction mode which is the motion prediction mode for a first motion prediction unit block corresponding to the reference block and determines whether or not the first motion prediction mode is a skip mode, and
    acquires a second motion prediction mode which is the motion prediction mode for a second motion prediction unit block and determines whether or not the second motion prediction mode is a skip mode when the first motion prediction mode is not a skip mode and the size of the reference block is larger than the threshold, the second motion prediction unit block being obtained by dividing the reference block hierarchically;

a predictor
- to determine an estimated vector from an adjacent motion vector and set the estimated vector as a motion vector for the first motion prediction unit block to create a prediction image when the first motion prediction mode is a skip mode, and
- to determine an estimated vector from an adjacent motion vector and set the estimated vector as a motion vector for the second motion prediction unit block to create a prediction image when the first motion prediction mode is not a skip mode and the second motion prediction mode is a skip mode, and
- to create a prediction image based on the second motion prediction mode and the motion vector decoded by the decoder when the first motion prediction mode is not a skip mode and the second motion prediction mode is not a skip mode; and an adder to add a prediction error signal set to zero and the prediction image when the first motion prediction mode or the second motion prediction mode is a skip mode.

2. An image decoding method of decoding a predictive-encoded bit stream to acquire a moving image signal, the bit stream being generated by dividing a frame of the moving image signal into reference blocks and by performing a motion prediction for the reference block, the image decoding method comprising:

changing an occurrence probability depending on dividing an adjacent block of the reference block for decoding the bit stream;

decoding the bit stream to acquire information indicating a size of the reference block, information indicating a threshold on a block size which corresponds to a minimum size of a motion prediction unit block, a motion vector, and a motion prediction mode, wherein the decoding
- acquires a first motion prediction mode which is the motion prediction mode for a first motion prediction unit block corresponding to the reference block and determines whether or not the first motion prediction mode is a skip mode, and
- acquires a second motion prediction mode which is the motion prediction mode for a second motion prediction unit block and determines whether or not the second motion prediction mode is a skip mode when the first motion prediction mode is not a skip mode and the size of the reference block is larger than the threshold, the second motion prediction unit block being obtained by dividing the reference block hierarchically;

creating a prediction image by determining an estimated vector from an adjacent motion vector and by setting the estimated vector as a motion vector for the first motion prediction unit block when the first motion prediction mode is a skip mode, creating a prediction image by determining an estimated vector from an adjacent motion vector and by setting the estimated vector as a motion vector for the second motion prediction unit block when the first motion prediction mode is not a skip mode and the second motion prediction mode is a skip mode, creating a prediction image based on the second motion prediction mode and the motion vector decoded by the decoding step when the first motion prediction mode is not a skip mode and the second motion prediction mode is not a skip mode; and adding a prediction error signal set to zero and the prediction image when the first motion prediction mode or the second motion prediction mode is a skip mode.

3. An image encoding device which generates a predictive-encoded bit stream by dividing a frame of a moving image signal into reference blocks and by performing a motion prediction for the reference block, the image encoding device comprising:

an arithmetic encoder to change an occurrence probability depending on dividing an adjacent block of the reference block for encoding into the bit stream;

an encoder to encode, into the bit stream information indicating a size of the reference block, information indicating a threshold on a block size which corresponds to a minimum size of a motion prediction unit block, a motion vector, and a motion prediction mode, wherein the encoder
- encodes a first motion prediction mode which is the motion prediction mode for a first motion prediction unit block corresponding to the reference block, and
- encodes a second motion prediction mode which is the motion prediction mode for a second motion prediction unit block when the first motion prediction mode is not a skip mode and the size of the reference block is larger than the threshold, the second motion prediction unit block being obtained by dividing the reference block hierarchically;

a predictor
- to create a prediction image by determining an estimated vector from an adjacent motion vector and by setting the estimated vector as a motion vector for the first motion prediction unit block when the first motion prediction mode is a skip mode,
- to create a prediction image by determining an estimated vector from an adjacent motion vector and by setting the estimated vector as a motion vector for the second motion prediction unit block when the first motion prediction mode is not a skip mode and the second motion prediction mode is a skip mode, and
- to create a prediction image based on the second motion prediction mode and the motion vector encoded by the encoder when the first motion prediction mode is not a skip mode and the second motion prediction mode is not a skip mode; and an adder to add a prediction error signal set to zero and the prediction image when the first motion prediction mode or the second motion prediction mode is a skip mode.

4. An image encoding method of generating a predictive-encoded bit stream by dividing a frame of the moving image signal into reference blocks and by performing a motion prediction for the reference block, the image encoding method comprising:

changing an occurrence probability depending on dividing an adjacent block of the reference block for encoding into the bit stream;

encoding, into the bit stream,
- information indicating a size of the reference block,
- information indicating a threshold on a block size which corresponds to a minimum size of a motion prediction unit block,
- a motion vector, and
- a motion prediction mode, wherein the encoding step
  encodes a first motion prediction mode which is the motion prediction mode for a first motion prediction unit block corresponding to the reference block, and
  encodes a second motion prediction mode which is the motion prediction mode for a second motion prediction unit block when the first motion prediction mode is not a skip mode and the size of the reference block is larger than the threshold, the second motion prediction unit block being obtained by dividing the reference block hierarchically;
  creating a prediction image by determining an estimated vector from an adjacent motion vector vectors and by setting the estimated vector as a motion vector for the first motion prediction unit block when the first motion prediction mode is a skip mode,
  creating a prediction image by determining an estimated vector from an adjacent motion vector and by setting the estimated vector as a motion vector for the second motion prediction unit block when the first motion prediction mode is not a skip mode and the second motion prediction mode is a skip mode, and
  creating a prediction image based on the second motion prediction mode and the motion vector encoded by the encoding step when the first motion prediction mode is not a skip mode and the second motion prediction mode is not a skip mode; and
  adding a prediction error signal set to zero and the prediction image when the first motion prediction mode or the second motion prediction mode is a skip mode.

5. A non-transitory recording medium which includes a predictive-encoded bit stream decoded by an image decoding device,
  the bit stream
    being generated by dividing a frame of the moving image signal into reference blocks and by performing a motion prediction for the reference block, and including
      information indicating a size of the reference block,
      information indicating a threshold on a block size which corresponds to a minimum size of a motion prediction unit block,
      a motion vector, and
      a motion prediction mode,
  wherein the bit stream includes
    a first motion prediction mode which is the motion prediction mode for a first motion prediction unit block corresponding to the reference block, and
    a second motion prediction mode which is the motion prediction mode for a second motion prediction unit block obtained by dividing the reference block hierarchically when the first motion prediction mode is not a skip mode and the size of the reference block is larger than the threshold, and
  wherein the image decoding device
    creates a prediction image by determining an estimated vector from an adjacent motion vector and by setting the estimated vector as a motion vector for the first motion prediction unit block when the first motion prediction mode is a skip mode,
    creates a prediction image by determining an estimated vector from an adjacent motion vector and setting the estimated vector as a motion vector for the second motion prediction unit block when the first motion prediction mode is not a skip mode and the second motion prediction mode is a skip mode,
    creates a prediction image based on the second motion prediction mode and the motion vector included in the bit stream when the first motion prediction mode is not a skip mode and the second motion prediction mode is not a skip mode, and
    changes an occurrence probability depending on dividing an adjacent block of the reference block for decoding the bit stream, on a basis of the bit stream.

* * * * *